Figure 5:
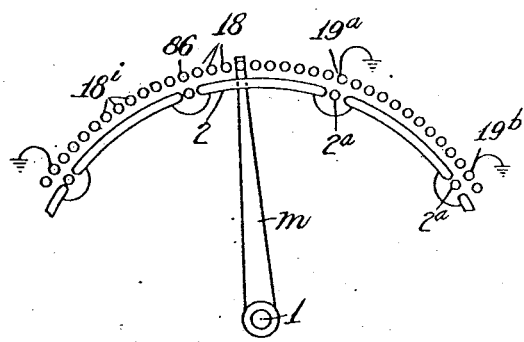
Figure 6:
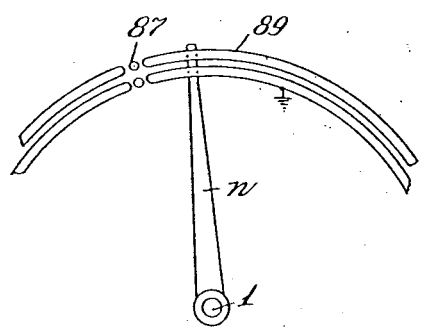

W. KAISLING.
SELECTOR SWITCH FOR AUTOMATIC EXCHANGES.
APPLICATION FILED APR. 15, 1908.
1,110,492.
Patented Sept. 15, 1914.
7 SHEETS—SHEET 1.
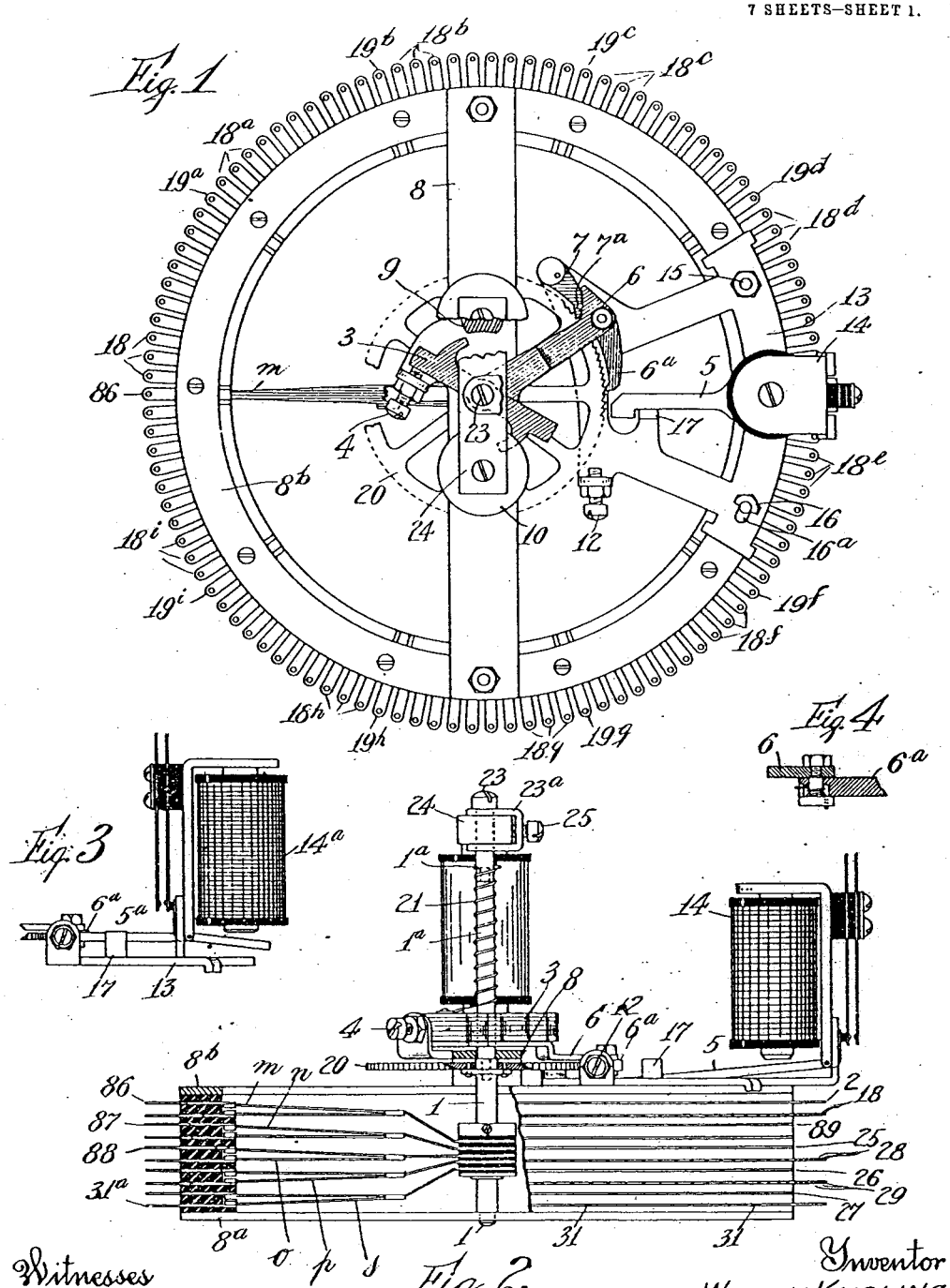
Witnesses
G. E. Mueller
J. G. Kellogg
Inventor
WILLIAM KAISLING
by Leroy D. Kellogg
Atty W. KAISLING.
SELECTOR SWITCH FOR AUTOMATIC EXCHANGES.
APPLICATION FILED APR. 15, 1908.

1,110,492.

Patented Sept. 15, 1914.
7 SHEETS—SHEET 2.

Witnesses
G. E. Mueller
J. G. Kellogg

Inventor
WILLIAM KAISLING
by Leroy D. Kellogg
Atty

W. KAISLING.
SELECTOR SWITCH FOR AUTOMATIC EXCHANGES.
APPLICATION FILED APR. 15, 1908.
1,110,492.
Patented Sept. 15, 1914.
7 SHEETS—SHEET 3.
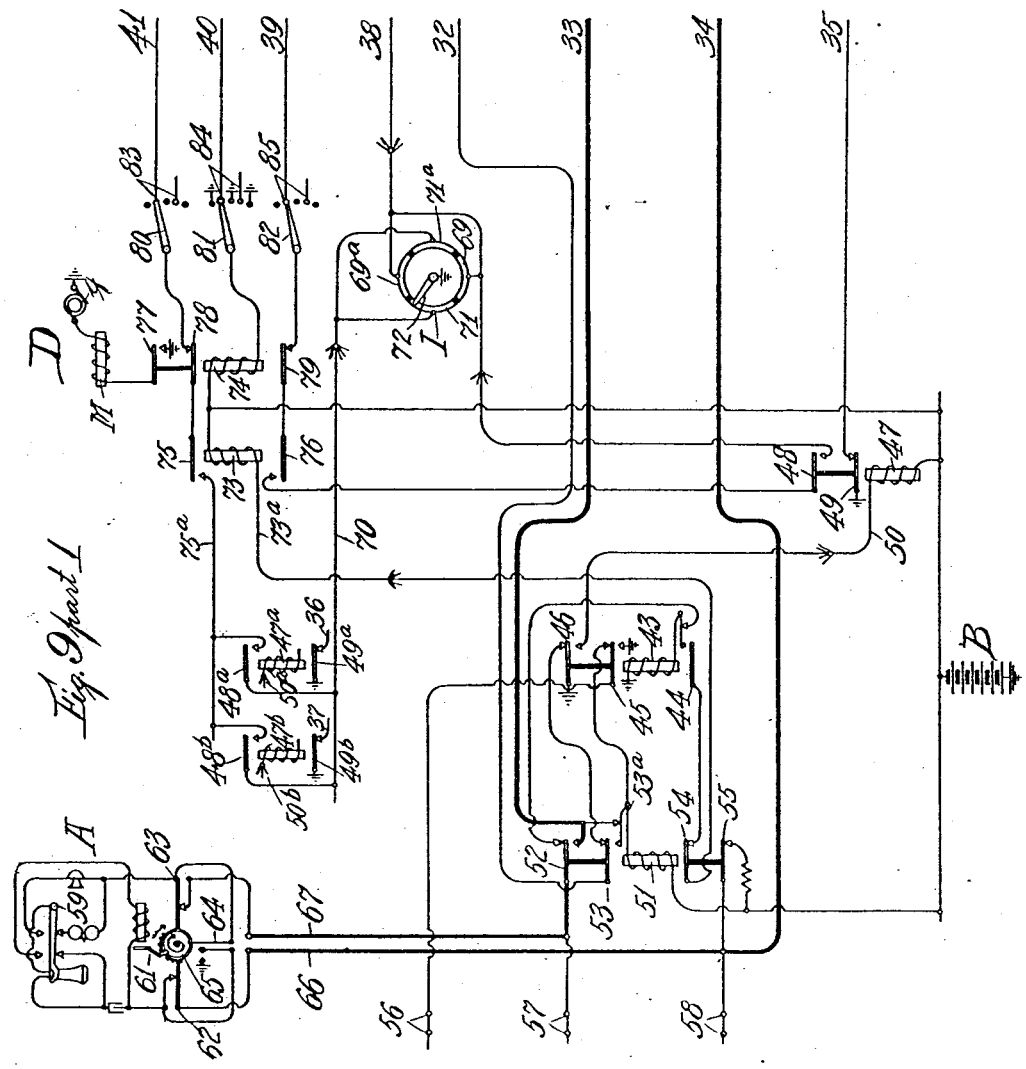
Witnesses
G. E. Mueller
J. G. Kellogg
Inventor
WILLIAM KAISLING
by Leroy D. Kellogg
Atty.

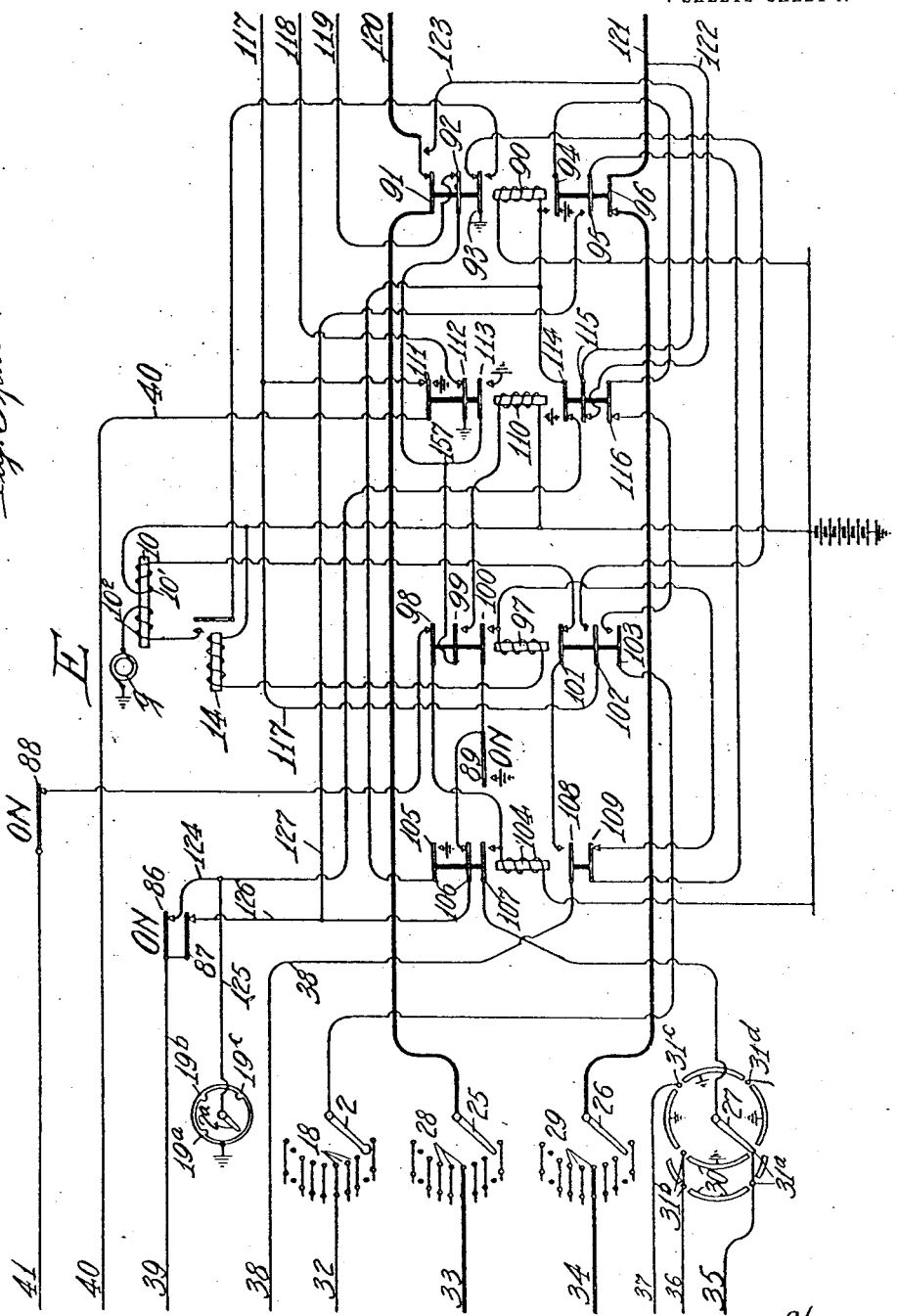

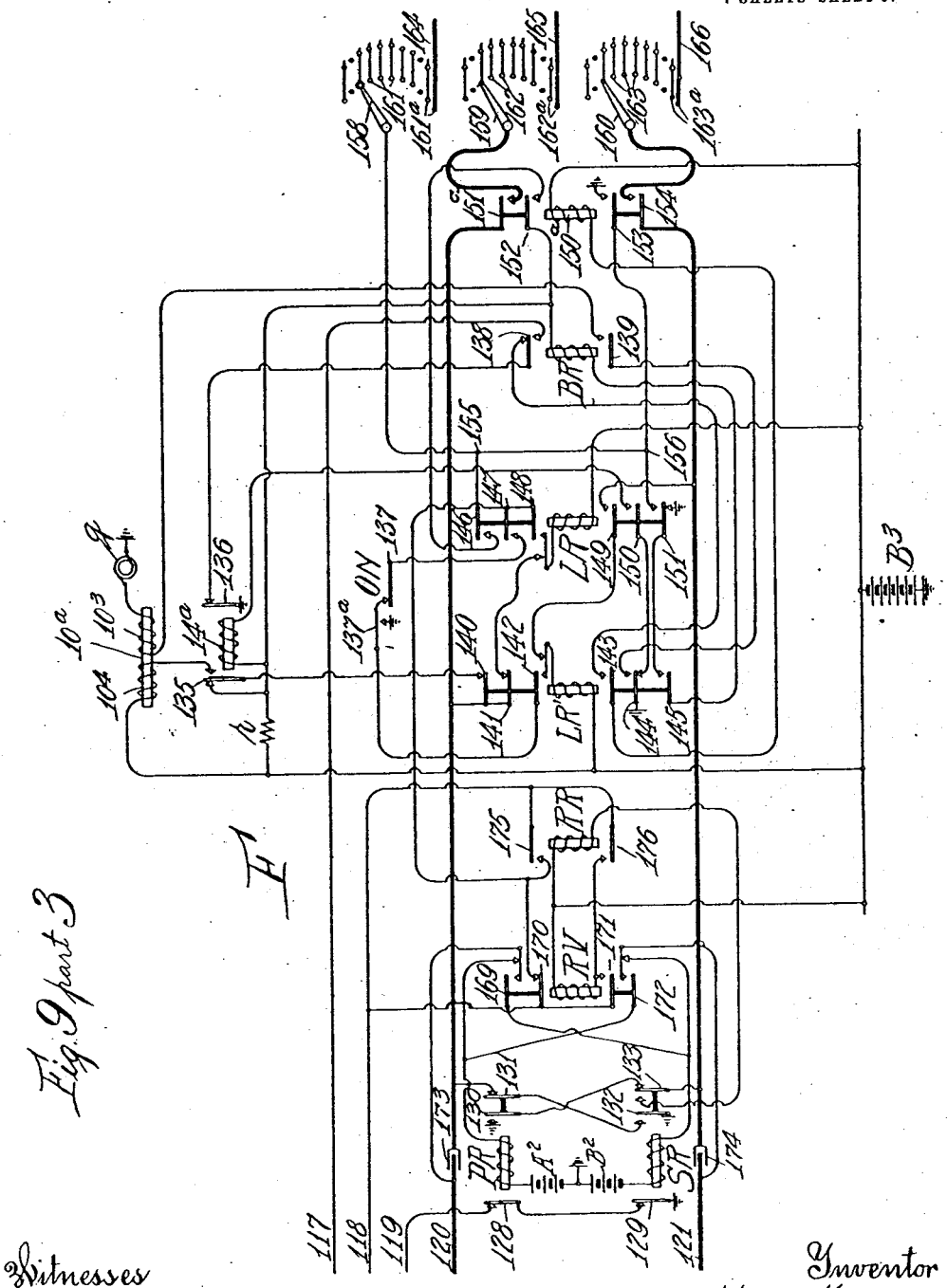

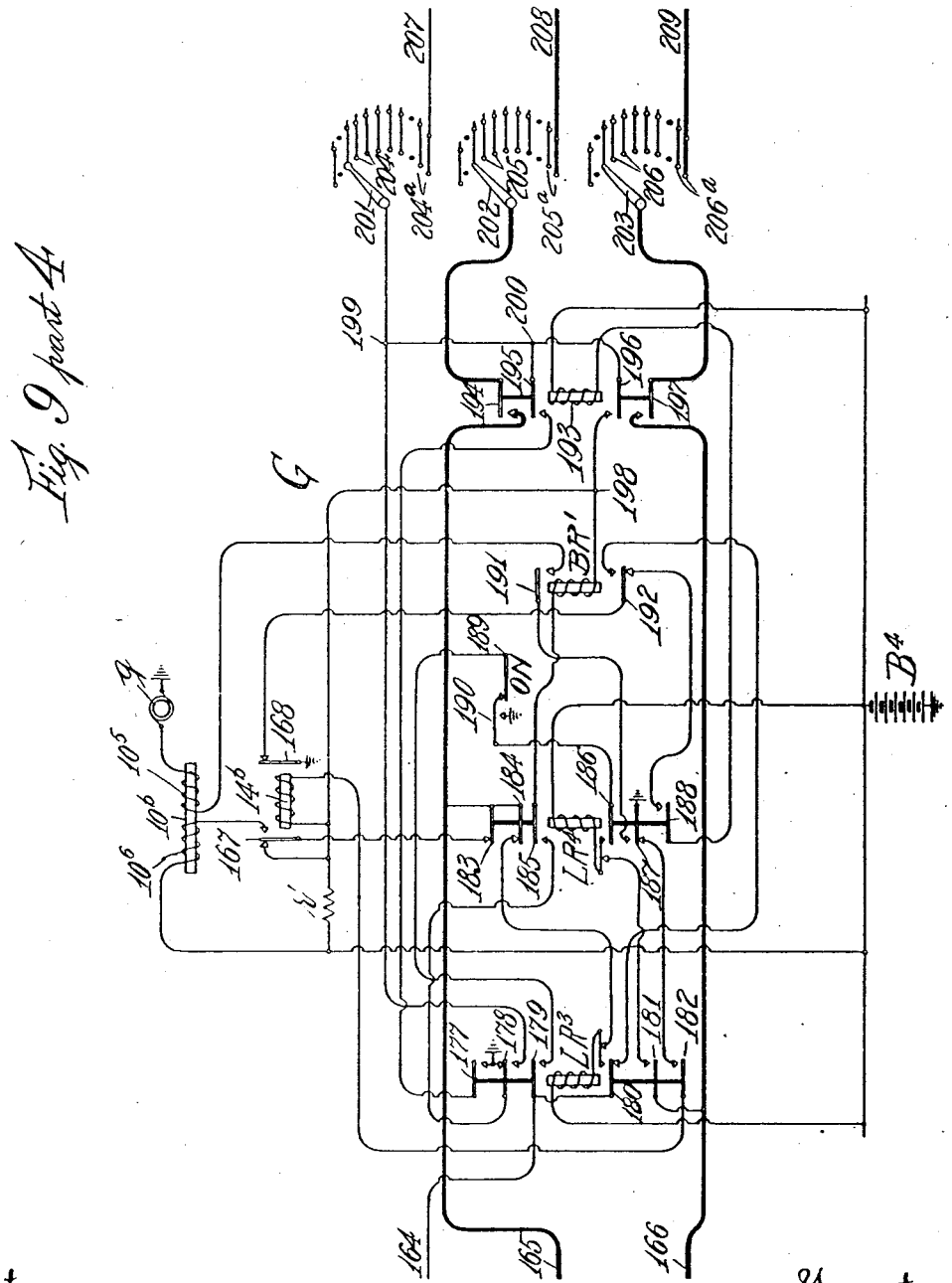

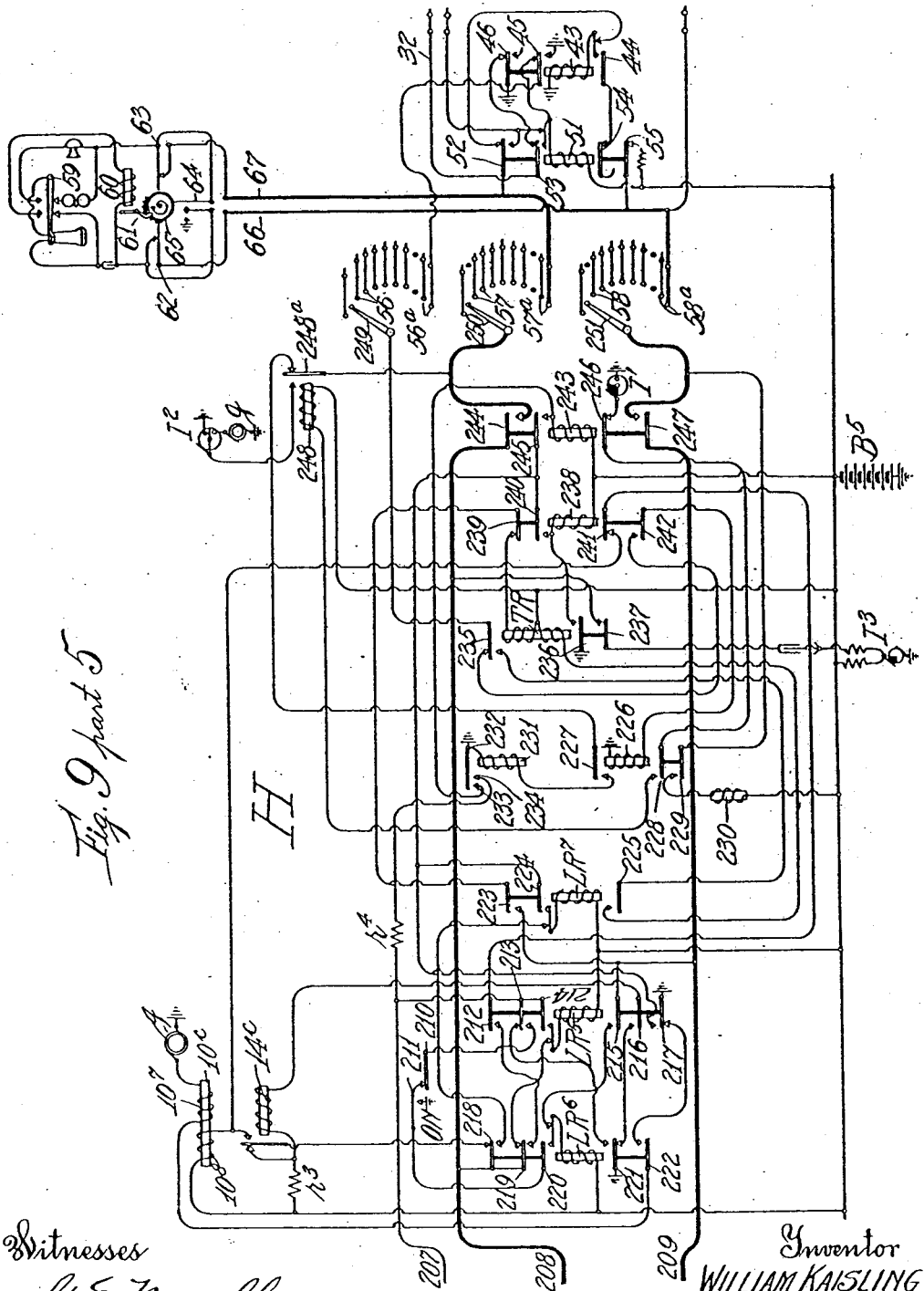

UNITED STATES PATENT OFFICE.

WILLIAM KAISLING, OF CHICAGO, ILLINOIS, ASSIGNOR, BY MESNE ASSIGNMENTS, TO KELLOGG SWITCHBOARD & SUPPLY COMPANY, A CORPORATION OF ILLINOIS.

SELECTOR-SWITCH FOR AUTOMATIC EXCHANGES.

1,110,492. Specification of Letters Patent. Patented Sept. 15, 1914.

Application filed April 15, 1908. Serial No. 427,256.

*To all whom it may concern:*

Be it known that I, WILLIAM KAISLING, residing in Chicago, county of Cook, State of Illinois, have invented new and useful Improvements in Selector-Switches for Automatic Exchanges, of which the following is a specification.

My invention includes a selector switch mechanism involving certain novel arrangements of parts, and also involves, to a certain extent, the circuit arrangements in connection with which the mechanism is to be operated.

My invention is directed toward a selector in which a plurality of groups of contacts are included, with which traveling or wiper contacts are associated. In the operation of the selector, it is required to move the switch wipers a series of steps from group to group, each step causing the wipers to select a different group of contacts. It is then required to move the wipers step by step to engage, with each step, a successive contact set of the previously selected group.

An important feature of the present invention consists in this, that but a single magnet is employed for adjusting the wipers to select a group of contacts and to thereafter select the desired contact set out of the group. The said magnet may be a driving magnet whose armature may be provided with an actuating pawl adapted to drive a ratchet wheel, for example, and in the preferred embodiment of the invention, the armature of the said magnet is caused to make long strokes when performing its group selecting function, and to make short strokes when performing its contact-selecting function.

In the preferred embodiment of the invention, the contacts of the selector are arranged by groups in a circular contact; and switch wipers, which are preferably fastened to a rotary shaft which also carries a ratchet wheel associated with the driving pawl of the single magnet referred to, are preferably driven rotarily, each long step moving them from one between-group position to the next. For restoring the switch wipers to normal from any one of the selecting positions, additional short steps of the wipers are produced, which steps continue until one complete revolution is made, when the switch will be at normal.

While I have shown my improved selector as arranged for rotary travel, it is to be understood that the invention is not limited in this respect, as other shapes of contact banks may obviously be employed and it is, of course, within the scope of the invention that a rectilinear bank might be preferred, in which case one of the well-known spring or gravity releases would be employed to restore the switch when it had passed over all its contacts.

Another feature of the invention resides in that portion of the switch including the specific arrangement of the driving magnet and its parts.

Further novelty is found in the mechanism which is employed to change the progression of the switch wipers from the long step travel to the short step travel. In the preferred form of the invention, this is accomplished by means of an auxiliary magnet whose armature carries a stop adapted to be moved into and out of the path of the driving pawl of the switch. When the said stop is out of the path, long steps of the switch wipers are produced by long strokes of the pawl and of the armature driving it. When the stop is in the path of the driving pawl, short steps of the wipers are produced because the stop limits each stroke of the driving pawl and of the armature actuating said pawl. Of course it is apparent that the stop referred to, instead of being placed in the path of the driving pawl when in its limiting position, may equally well be arranged to be placed in the path of the armature itself.

Other possible arrangements will suggest themselves to telephone engineers, and the invention is not limited to any specific means whereby long steps of a switch's wiper may be produced and then short steps thereof by the actuation of a single magnet.

Another object of the invention is to provide a simple and reliable means whereby the assuming of a between-contact position by the wipers is effectively prevented, practice having demonstrated that selector switches are to a certain extent liable in their operation to have their wipers come to rest, not in squarely alined engagement with the desired contacts, but in a position between two contacts.

Referring to the drawings, I have illustrated in Figure 1 a top view of a preferred mechanical construction of the selector of my invention; Fig. 2 illustrates a side view thereof, certain portions of the mechanism being omitted to show more clearly certain details; Fig. 3 illustrates an alternate arrangement of the stop magnet and its stroke limiting pawl; Fig. 4 shows details of the driving pawl of the switch; Figs. 5, 6, 7 and 8 illustrate, to a certain extent diagrammatically, the wiper arrangement of the switch; Fig. 9, comprising parts 1 to 5 inclusive, illustrates a preferred form of circuit arrangement in connection with which the selector may be operated.

Referring first to Figs. 1 to 8 inclusive, ten groups of contacts are indicated, the first group consisting of ten contacts 18 included between the between-group contacts 86 and 19ª; a second group including contacts 18ª spaced between contacts 19ª and 19ᵇ; the third group, including contacts 18ᵇ and additional groups 18ᶜ, 18ᵈ, etc., are provided up to 18ⁱ, the groups being separated from each other by the respective between-group contacts 19, the whole making a circular contact bank. In Fig. 2, wherein a portion of the bank is cut away and a sectional view afforded, it is seen that the contacts extend to the interior of the circle and are spaced apart by suitable rings of insulating material, the whole being firmly clamped together between the circular base 8ª and the ring 8ᵇ to secure rigidity. Five sets of wipers m, n, o, p, s, are illustrated in Fig. 2, being shown in their normal positions engaging the normal contacts 86, 87, 88 and 81ª. The different pairs of wipers are conductively connected together, but insulatingly mounted by pairs upon the wiper shaft 1, which is journaled to the base-plate 8ª and to the bridge 8 which extends across the diameter of the contact bank and is removably fastened at its two extremities to the bank. The ratchet wheel 20 is rigidly attached to the wiper shaft 1 and is adapted to be driven in a clockwise direction by the driving pawl 6.

Upon the bridge 8 are mounted the spools 10, 10, of the driving electromagnet, the core of each spool having at its lower extremity a pole-piece of the shape indicated at 9. The upper ends of the cores have screwed to them the bridge 24 of magnetic material which serves to increase the effectiveness of the magnetic circuit and for other purposes presently to be mentioned. The armature of the driving magnet is rigidly fastened to the armature shaft 1ª which, at its lower extremity, extends into a suitable orifice in the wiper shaft 1. The upper extremity of the armature shaft 1ª is fitted into the slotted stud 23 so that the said shaft 1ª is free to turn in the bearings at its upper and lower extremities. A spring 21 is provided, spiraled about the armature shaft 1ª, one end of said spring being connected to the armature a little to one side of the shaft 1ª, while the other end is fastened to the slotted stud 23 which extends through an orifice in the bridge 24. A stirrup 23ª embraces the stud 23 above and below the bridge 24 and is threaded to receive the screw 25. To adjust the tension to be exerted by the spring 21 upon the armature 3, the screw 25 may be loosened and the slotted stud 23 turned in such a way as to increase or decrease the tension of the spring. When the tension is properly adjusted, the screw 25 may be screwed in to contact with the bridge 24, when the stud 23 will be firmly held in its adjusted position by the friction of 23ª.

The shaft 1ª is disposed between the spools 10, 10, one spool being omitted in Fig. 2 to more clearly show the arrangement of the parts, and the armature 3 extends in its normal position shown transversely between the spools, its middle point being rigidly attached to the shaft 1ª. Toward its extremities, the armature has finger extensions reaching to positions adjacent to the concave fronts of the pole-pieces 9 of the cores of the magnet spools 10, 10, while the armature ends extend beyond the finger extensions, the whole furnishing an arrangement well calculated to produce a strong initial pull when the magnets are energized and to permit a long stroke of the armature. The spring 21 normally holds the armature 3 against the stop 4 which is threaded to a projection of the bridge 8 and is provided with a suitable lock-nut.

A generally triangular piece 13 is provided, fastened to the contact bank by the bolts 15 and 16. This piece 13 supports the stop magnet 14 controlling the stroke limiting stop 5. It has also an upwardly extending arm to which is threaded the screw 12, serving as a stop to limit the extent of actuation of the driving pawl 6ª, when long stroke travel of the switch is being produced, said pawl 6ª being pivotally associated with the arm 6 rigidly attached to the shaft 1ª. The pawl limiting stop 5 of Fig. 1 is normally below the path traversed by the pawl 6ª; and when magnet 14 is actuated, the stop 5 will be raised into the path of the pawl 6ª and will so limit the stroke of the pawl and of the armature 3. The extension 17 of the piece 13 serves as an abutment for the stop 5 when the pawl 6ª impacts upon it. In addition to the parts mentioned, the piece 13 carries a post to which is pivoted the retaining pawl 7 having the pin 7ª in the path of the return stroke of the armature 6 for the purposes to be presently mentioned.

It is apparent that the switch bank, the associated driving magnet and wipers, constitute a very simple mechanical structure and one not liable to get out of order. Should, however, any difficulty arise, the bridge 8 may readily be unfastened from the bank, and the wipers, shafts and magnet removed and a new set put in place. The wipers and their shaft are separately removable from bridge 8 and magnet 10. The mechanism associated with the piece 13 is also self contained, and in case any part thereof should get out of adjustment, the bolts 15, 16, may be unfastened and the piece 13 with its mechanism removed and another one substituted. It is thus apparent that the switch as a whole is composed of four self contained units, first of the bank proper, second the bridge 8 with its associated driving magnet, third the shaft and wipers, and fourth the piece 13 with its mechanism.

The orifices in the piece 13, fitting about the bolts 15, 16, are not shaped to fit snugly about the said bolts, but extend laterally as indicated at 16ª to permit of lateral adjustment of the piece 13 when the same is being fastened to the bank. When adjusted so that correct position of stop 5 and pawl 7 are secured, the nuts of the bolts 15, and 16 are tightened.

A preferred way of adjusting the switch consists in placing the wipers at normal on contact 86. The piece 13 is then adjusted so that arm 6ª contacts with the pin 7ª while the wiper is in correct normal alinement. Then stop 4 is adjusted so that when pawl 7 fully fills the tooth, the pressure of arm 6 upon pin 7ª, or equivalent device, is relieved, so as to avoid unnecessary wear. Then the stop 12 is adjusted by trial to permit of the exact length of long step required.

The arrangements described for adjusting purposes also admit of securing the correct separation of armature from the pole pieces when the armature completes its long stroke, so as to prevent any tendency to freeze by a too close approach to the pole pieces.

In the operation of the switch of Figs. 1 and 2, actuation of the magnet spools 10, 10, magnetizes the pole-pieces 9 and attracts the extremities of the armature 3. Assuming that this occurs while magnet 14 remains inert, a long stroke of the pawl 6ª and of the armature 3 will be produced, continuing until the pawl 6ª impacts upon stop 12. When current ceases through the spools 10, the pole-pieces 9 de-magnetize and the spring 21 restores the shaft 1ª and the armature 3. By its engagement with a tooth of the ratchet 20, the pawl 6ª will now have effected a long step of the wipers m, n, o, p, s, removing them from normal over one entire group of contacts. The piece 6, on the retraction of the armature 3, engages the pin 7ª upon the pawl 7 and holds the pawl 7 then firmly in whatever tooth of the ratchet 20 it rests at the conclusion of the long stroke, thus effectively preventing back movement of the ratchet and wipers by jar when the armature and pawl 6ª are retracted. Successive actuations of the spools 10 will operate as before to move the wipers successive long steps from one group to the next as long as the magnet 14 remains inert.

Assuming that sufficient long steps of the wipers have been produced to select the desired group of contacts, the magnet 14 will be energized to draw the stop 5 into the path of the driving pawl 6ª, and further actuation of the spools 10 will be produced. Each such actuation will, however, owing to the stop 5 being "in", produce a step of the switch wipers the space from one contact 18 to the next contact 18 of the selected group. At the conclusion of each such step, the pawl 7 will slip over the top of a tooth of the ratchet 20 into engagement with an adjacent tooth. If, however, the pawl 6ª should be only actuated sufficiently to produce a partial short step, the pawl 7 will not be engaging an adjacent tooth, but will be still partially filling the previously engaged tooth of the ratchet 20. Under these circumstances, on the retraction of armature 3, and upon the impact of arm 6 with the pin 7ª, the pawl 7 will be jammed into the ratchet tooth, with which it is then associated, with force sufficient to cause back movement of the ratchet 20 to bring the wipers into alinement with the contacts previously engaged by them.

In Fig. 3 I have illustrated an alternate arrangement of the stroke limiting stop. In said Fig. 3, the stop 5ª is normally in the path of the pawl 6ª, that is, when the stop magnet 14ª is deënergized. When the structure of Fig. 3 is employed in association with the driving magnet structures of Figs. 1 and 2, it is necessary to simultaneously energize the stop magnet 14ª and the spools 10, 10, of the driving magnet when long step travel of the switch wipers is to be produced. Then when short step travel is to be produced, magnet 14ª is deënergized and actuations of the spools 10, 10, then cause short steps of the switch. The pawl 5ª is preferably provided toward its end with a forwardly projecting extension, as plainly shown at 5 in Fig. 1. Then if the magnet 14ª should deënergize while pawl 6ª is in engagement with stop 12, the said extension will bear upon the rear portion of pawl 6ª and will be prevented from coming up behind said pawl and so preventing the proper back stroke. When the arrangement of Fig. 1 is employed, it is preferable to provide nonmagnetic spacers between the contacting surfaces of pawl 6ª and the stop 5, since if both are made of magnetic material, as steel, there may be a certain tendency to stick or freeze, since the two engage when magnets 14 and 10 are both energized. When, however, the arrangement of Fig. 3 is employed in which the magnet 14ᵃ is deënergized when pawl 6ᵃ and stop 5ᵃ are engaging one another, there is no occasion whatever for such spacers.

As the circuit arrangement in Fig. 9 is drawn out, the system illustrated has a capacity of ten thousand subscribers' lines, first selectors F being provided for the purpose of selecting the thousands, second selectors G for selecting the hundreds, and connectors H for selecting the tens and units.

I preferably employ one hundred point switches having their contacts arranged in ten groups of ten contact sets each. Assuming ten thousand subscribers' lines, the lines, as called lines, would be divided into one hundred groups of one hundred lines each, and each such group on the usual ten per cent trunking basis would be provided with their multiple called contacts appearing in the banks of ten connectors. The group to which any line as a called line is assigned, will be determined by the directory number which the line bears, so that all the lines having their multiple called contacts at a group of ten connectors would have directory numbers of the same hundreds value. Further, the multiple called contacts of the one hundred lines at their assigned connectors would be arranged in ten sub-groups of ten contact sets each, the position of each such sub-group as to the serial order in which their contacts will be engaged by the wipers of the connectors being determined by the tens value in the hundred.

For the one hundred groups of called lines, there will, therefore, be one hundred groups of ten connectors each, making a thousand connectors in all. The one hundred connectors for the ten one hundred line groups, constituting the first thousand lines of the exchange, will have their contacts 204, 205, 206 multiplied at the banks of the second selectors G assigned for that thousand; and the multiple contacts of the connectors for the first hundred of the first thousand will constitute the first group of ten contacts of each second selector for that thousand; the contacts for the connectors for the second hundred of the first thousand will constitute the second group of contacts of the second selectors for that thousand, and so on for the other groups for the first thousand. Corresponding connections will be made from the different groups of ten connectors of the hundreds of the other thousands to the second selectors assigned to those thousands. On the usual ten per cent trunking basis, there will, of course, be one hundred second selectors G for each thousand of the exchange and the contacts of the connectors will, therefore, if uniform multiplying be observed, be multiplied one hundred times, once at each second selector for the respective thousand.

Each second selector G is provided with multiple contacts 161, 162, 163, appearing in the banks of first selectors F, which first selectors are, of course, common for connection with all subscribers in the exchange. On a ten per cent basis, there would be one thousand first selectors F and each such first selector would have before its wipers 158, 159, 160, ten groups of multiple contacts, the contacts of each group being connected to the second selectors G for a different thousand. There being one thousand first selectors F and one thousand second selectors G, there will be a total of one hundred thousand multiple contact sets 161, 162, 163 at the first selectors, so that each second selector G will have its contacts multiplied only at one-tenth of the first selectors F in the usual course of multiplying.

Each first selector F has permanently joined to it a line selector E before whose wipers 2, 25, 26, appear multiple contact sets 18, 28, 29, of one hundred lines; which sets of contacts may be called "multiple calling contacts." The lines of the exchange, as calling lines, are divided into groups of one hundred; and on a ten per cent basis, the multiple calling contacts of each one hundred line group will be multiplied before the wipers 2, 25, 26, of ten line selectors assigned to that group of lines as calling lines. Further, the multiple contact sets of each one hundred line group would be divided into ten sub-groups of ten contact sets each, and when any calling line initiates a call, a line selector E will operate to select the group in which the calling line has its contact set included and then will pick out the individual multiple contacts of the calling line whereby the line selector E will have caused its paired first selector F to be operatively connected with the calling line. After this, directive impulses will be transmitted from the calling line to cause the first selector to pick out a group of second selectors for the wanted thousand and then an idle selector out of such group; thereafter directive impulses will adjust the second idle selectors to pick out the group of connectors wanted and then an idle connector out of such group; whereafter the selected connector will be adjusted to pick out the required group of lines and then the required line out of such group.

In the diagram, Fig. 9, part 1, I have illustrated a calling substation A connected by the line conductors 66 and 67 with a suitable line circuit arrangement at the exchange. The substation at A includes the customary switch-hook 59, normally holding the call-bell in an operative bridge of the line limbs and adapted, on the removal of the receiver, to be lifted, disconnecting the call-bell and operatively connecting the talking set with the line. A calling device or dial 65 is provided, said calling device being normally locked by a pivoted pawl 61 controlled by the magnet 60 whose windings also serve as the impedance coil for the talking set. When the coil of 60 is energized, its armature is attracted and the pawl 61 withdrawn from engagement with the dial 65 so that the same may be rotated by hand in the direction of the arrow. The dial 65 has attached to it suitable teeth of insulating material which control the connections of the impulse springs 62 and 63, and the said dial also carries on its lower part a stud of insulating material, which, when the dial is at normal as shown, holds the spring 64 disengaged from its associated spring. When the dial is rotated by hand in the direction of the arrow, the said stud frees spring 64 which, by its tension, engages its contact and makes connection with ground. When released, the dial rotates back to normal; and when it reaches this point, the said stud restores spring 64 to its normal relation shown. It is obvious that the rotation of dial 65 in the direction of the arrow has no operative effect upon the springs 63 and 62. When, however, it is released, the teeth of insulating material operate to momentarily open contact 63 as many times as there have been teeth brought below said spring. After the last tooth passes above spring 63, the tooth at the extreme left causes a momentary opening of contact 62 whereafter the calling device reaches normal and its motion is arrested. While the openings of circuit were being made at contact 63 in the line limb 67, it is apparent that line limb 66 will be connected through contact 62 to ground through the contact of spring 64. Conversely, when the circuit of limb 66 is opened at contact 62, limb 67 will be grounded through contact 63 and spring 64. Also when the calling device reaches normal, a conductive bridge of line limbs 66 and 67 will be established through the substation before contact 64 is opened, it being remembered that the dial 65 is only operable when magnet 67 is energized and magnet 60 can only be energized when hook-switch 59 is in its alternate position.

It is thus apparent that by the operation of the dial 65, a calling subscriber can cause a number of sets of openings of line limb 67 at contact 63, while line limb 66 continues grounded, each set of openings of line limb 67 being necessarily followed by one opening of line limb 66, while limb 67 remains grounded. By successful actuations of the dial 65, the calling subscriber is enabled to count out the digits comprising the number of the called subscriber and the various openings of line limbs 66 and 67 coöperate with the directively operable switches at the exchange in completing the connection with the called-for line.

As before indicated, the lines, as calling lines, are divided into groups of one hundred by having their multiple contacts grouped at the exchange before the line selectors. The ten line selectors E for each such group of one hundred lines are preferably not constantly operating devices, but are normally at rest, their wipers having a fixed or normal position. For starting an idle line selector E when a call is initiated, a master switch mechanism D is provided, one for the one hundred lines, including wipers 80, 81, 82, having before them contacts 83, 84, 85, one such set being provided for each line selector of a one hundred line group. Each line of a group has its line relay 43, and a common conductor 73$^a$ is provided, connected to the master-switch relay 73 and having branches, one to each of the line relays of one hundred lines whereby any calling line of the one hundred may control the master-switch D to start an idle line selector. Each line, in addition to its line relay 43 individual to it, has its cut-off relay 51, the latter being employed to render the line relay inoperative when the line is connected with it.

As before indicated, the multiple contacts 18, 28, 29, of the one hundred lines of a group of calling lines, are divided into ten groups of ten contact sets each at the line selector banks, whereby the one hundred lines are divided into ten sub-groups of ten lines each. Each such sub-group has a sub-group relay 47, 47$^a$ or 47$^b$, etc., and a sub-group contact 31$^a$, 31$^b$ or 31$^c$, etc., appearing before the group selecting wiper 27 of the line selectors E. The group relay 47 of each sub-group has an armature 49 controlling the electrical condition of the group contact 31 and an armature 48 which coöperates with the constantly traveling interrupter I and with the master-switch mechanism D in starting an idle line selector E. Each such group relay 47 is connected by a common conductor 50 having ten branches, one extending to each line relay of its sub-group, so that the line relay of any line of a sub-group can control the respective group relay.

The common interrupter I is provided having two pairs of segments 69, 69$^a$, and 70, 71$^a$, and the grounded wiper 72 is constantly traveling over the segments at a rapid rate, successively grounding them. The segments 69 and 69$^a$ are connected to a common conductor 38 which has branches extending to armatures 108 of the relays 104 of the different line selectors E and the interrupter is employed, among other uses, to transmit currents over the conductor 38 to operate the windings 10′ of the driving magnets 10 to produce the long-step travel of the switches E. In order to prevent a winding 10′ from being actuated by a partial impulse over wire 38, whereby but a partial long step of a switch E might be produced, the circuit at each switch E is so arranged that its relay 104, which controls the contact 108 in the circuit of winding 10′, can be actuated only by current through one of the segments 71 or 71ᵃ of the interrupter I. By this arrangement, no current can be passed through a winding 10′ upon the energization of the line relay 43 of a line and the consequent energization of the respective group relay, until the wiper 72 engages a contact 69 or 69ᵃ after having first been in engagement with the contact 71 or 71ᵃ to operate the relay 204, since the line and group relays were operated, whereby such operation of the line and group relays, which may occur at a time when the wiper 72 is about to pass off a segment 69 or 69ᵃ, is ineffective to produce a wrong operation of the line selector E by causing it to make a partial long step.

The selector shown in Figs. 1 to 8, inclusive, is more specifically a line selector. For the first and second selectors and for the connector, the stop magnet arrangement indicated in Fig. 3 is preferably employed, the said arrangement being the one in which the pawl 5ᵃ is normally in engaging relation with the pawl 6ᵃ.

While I have, in Fig. 9, at E, shown the circuit-closers or wipers 2ᵃ, 2, 25, 26 and 27 diagrammatically, as connected directly with the conductors of the line selector E, I have preferred, in the mechanical switch structure, to terminate the conductors, shown connected to the said wipers in Fig. 9, in stationary contacts while the switch wipers themselves in the mechanical structure have, in themselves, no circuit connection, but act merely to close conductive bridges between bank contacts with which they are associated. The electrical equivalency of the arrangement shown in Fig. 9, to those shown in Figs. 2, 5, 6, 7 and 8, will be apparent. In Fig. 2, five sets or pairs of wipers m, n, o, p and s are indicated, mounted one pair above the other upon the main switch shaft 1. Referring now to Figs. 5 to 8 inclusive, when the wipers are in their normal positions, they will be engaging respectively the contacts 86, 87, 88 and 31ᵃ. By referring now to Fig. 9, it will be apparent that when wipers m are in their normal position, they close the off-normal contact 86 to its associated contact, thus producing the normal circuit condition of contact 86 shown in Fig. 9. Similarly, when wipers n and o are in their normal positions, they close, respectively, the off-normal contacts 87 and 88 to their respective associated contacts as indicated in Fig. 9. It is also apparent that when shaft 1 is caused to make its first step, each of these off-normal contacts 86, 87, 88 will be opened, wiper n then closing the off-normal contact 89 to ground, the said contact continuing closed to ground until the wiper has completed its revolution and is restored, while the other off-normal contacts remain open until the line selector reaches normal.

The private wiper 2, indicated in Fig. 9, is, in its mechanical embodiment as shown in Fig. 5, represented by the conductively joined segments 2, while the contacts 18 are those adjacent to the said segments. The between-group contacts 19ᵃ, etc., are plainly indicated in Fig. 5, and the wiper 2ᵃ is represented by the contact 2ᵃ of Fig. 5, whereby the wiper m in a between-group position conductively bridges or closes a contact 19—2ᵃ.

Figure 7:
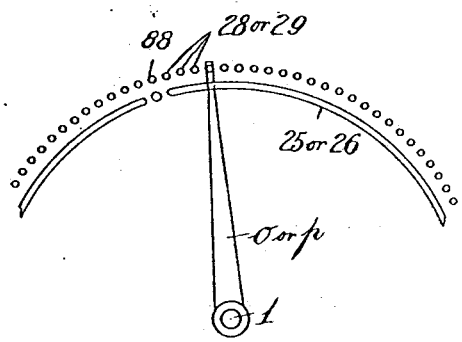
Figure 8:
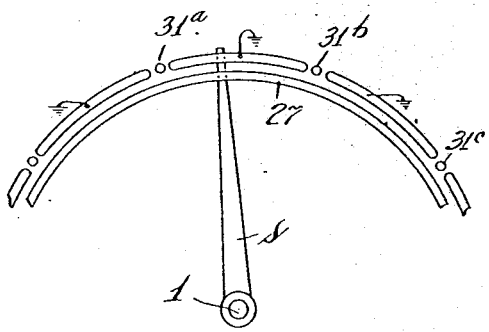

In Fig. 7, the common strip 25, which extends circularly complete except for the break at the off-normal contact 88, represents the wiper 25, while its adjacent sets of contacts 28 represent the multiple contacts of Fig. 9; and the same arrangement as that shown in Fig. 7 is employed for the wiper 26 and the contacts 29 as indicated by the alternate reference characters given in Fig. 7. The ring 27 in Fig. 8 is the equivalent of wiper 27 in Fig. 9. The wiper s has a between-group position closing contacts 27—31, 27—31ᵇ, just as indicated in Fig. 9, while the grounded segments of Fig. 9 are plainly indicated in Fig. 8.

It will be understood that switches of the general character shown in the mechanical figures are used for the first and second selectors and connectors, commons being employed for the wiper contacts shown in Fig. 9, the switch wipers thus being, as in the case of the line selector, without circuit connections in themselves and being used to cross the commons to the private contacts and the line contacts. The off-normal switch arrangements of the first selector, second selector and connector will be secured in the manner obvious from the description given of the off-normal arrangements of the line selector and need not be specifically referred to.

The detail of the circuit arrangements of Fig. 9 will best be understood when explained in connection with a description of the operation of the system and will now be described: it being assumed that A is a calling subscriber and desires his line to be connected with that of the subscriber whose substation is indicated at C and whose number will be assumed to be 2222.

Subscriber A, by removing his receiver to initiate a call, establishes a path for a flow of current from ground through line relay 43, through contacts 52, 63, the substation transmitter, the raised hook-lever 59, through magnet 60, closed contact 62, over line limb 66, armature 55 to battery B, operating line relay 43, which by armature 44, is locked to battery over the common conductor 73ᵃ and relay 73 of master-switch D. The flow of current through the substation may momentarily actuate the magnet 60 to unlock dial 65, but as soon as relay 43 attracts armature 44, the circuit through the substation is interrupted, magnet 60 will be deënergized, and pawl 61 will return to locking relation with dial 65, which now continues locked until a line selector E shall have selected the calling line. Thus the subscriber A will be prevented from actuating his calling device until his line shall have been brought into operative relation with the first selector F.

It will be seen that the multiple contacts 18 of the calling line are grounded over conductor 32 and through normal contacts 53 and 46 as long as the line circuit of A is at normal, the said multiple contacts 18 being thus normally unselectable at the line selector. Attracted armature 46, however, removes ground from the contacts 18, thus rendering them selectable, and grounds the common conductor 50 energizing the group relay 47, which, by armature 49, removes ground from the group contact 31$^a$. As soon as wiper 72 engages one of the segments 69 or 69$^a$, a circuit is completed from ground through attracted armature 48 over attracted armature 76, armature 79, wiper 82 of master-switch D (wipers 80, 81, 82 of the master-switch D normally engaging contacts 83, 84, 85 of an idle line selector E) through contact 85 of such idle line selector, over conductor 39, closed off-normal contact 86, normal contact 114, and the relay 90 to battery B', energizing the said relay 90. Since, as indicated by the location of the multiple contact 31$^a$ normally engaged by the wiper 27, the calling line is included in the first sub-group of ten, no long steps of the line selector E are required to be made to select the calling line in the present case, so that the winding 10' of magnet 10 is not employed; but the stop magnet 14 must be actuated at once and circuit must be closed through the short-step winding 10$^2$ to initiate the short-step travel of the switch. On the energization of relay 90, circuit is closed as follows: from battery B', through magnet 14, through relay 97, contact 109, attracted armature 95, wire 127, normal contact 87, conductor 39 and to ground at segment 69 or 69$^a$, through interrupter I. Attracted armature 93 has closed one break in the circuit of winding 10$^2$ and magnet 14 is now actuated to close the second break therein and to throw the stop pawl into operative relation with the mechanism of magnet 10. Circuit may now be traced from ground through generator $g$, winding 10$^2$, attracted armature of relay 14, alternate contact 93 to ground and magnet 10 will now be actuated by successive impulses from generator $g$ until the relay 90 is deënergized, each actuation of magnet 10$^2$ producing a short step of wipers 2, 2$^a$, 25, 26 and 27.

It will be noted that on the first step of the switch E, the off-normal, ON, contacts were shifted to alternate position whereby electromagnets 14 and 97 were locked to ground via contact 89 by means of the attracted armature 100. Armature 103 of relay 97 has now connected the winding of relay 90 through alternate contact 94 and normal contact 116 with the private wiper 2 of the line selector, and since, on the first step of the line selector, contacts 86 and 87 are opened, the relay 90 now depends for its continued energization upon the grounded contacts 18 to be encountered by wiper 2 as the wipers progress in their short-step travel. Contacts 18 of non-calling lines will be grounded at armature 46 of their respective line relays 43, and since wiper 2 engages a new contact 18 before leaving the previously engaged one, relay 90 will continue energized until the switch wipers in their travel have reached a point where wiper 2 engages an ungrounded contact 18, such being one pertaining to the calling line. At this time, circuit through relay 90 will obviously be opened, the relay will become deënergized and its armature 93 being retracted, will prevent further actuations of winding 10$^2$ of magnet 10, and the wipers of the line selector E will come to rest; the wipers 2, 25 and 26 engaging, respectively, the multiple contacts 18, 28 and 29 of the calling line, that of A. On the retraction of armature 93, ground is placed, via normal contact 93, alternate contact 102 and contact 111, upon the conductor 40 extending to the private contact 84 at the master-switch D, through its private wiper 81 and to battery through operating relay 74, energizing said operating relay, which opens contacts 78 and 79 to prevent any possible ground upon wipers 80 or 82. The armature 77 closes circuit for generator $g$ through motor-magnet M of the master-switch. Wipers 80, 81, 82, being mounted upon a rotary shaft in operative relation with the driving magnet M, are rotated step by step in search of contacts 83, 84, 85, pertaining to an idle line selector. Contacts 84 of line selectors in use will be connected to ground and relay 70 will continue energized, holding contact 77 closed until the master-switch wipers engage the contacts of an idle line selector, at which time the circuit for relay 74 will be open, the relay deënergized, its armature retracted, and wipers 80, 81, 82, will rest engaging the contacts 83, 84, 85, of such idle line selector and ready to start the same when another call is initiated from one of the lines of the group that the master-switch D serves.

As soon as relay 90 was first operated, it closed alternate contact 91 whereby a flow of current was produced from the positive side of battery A², Fig. 9, Part 3, through relay PR, normal contact at 169, over conductor 120, conductor 123, normal contact 115, conductors 122, 121, normal contact 172, relay SR to the active side of battery B², relays PR and SR being thereby energized. When, now, relay 90 is deënergized as described, current will find its way from battery A² through relay PR, normal contact 91, contact 25—28, conductor 33, normal contact 53ᵃ, cut-off relay 51 of the calling line A to battery, said relay 51 thereon energizing and, by the closure of contact 53—53ᵃ, locking itself to ground over conductor 32, contact 18—2, closed contacts 103, 116, and normal contact 94 to ground. The ground at 94, placed upon the multiple contacts 18 through the wiper 2, has made the contacts of the calling line unselectable to other line selectors. Since the armature 54 opens the circuit of relays 43 and 73, normal contact 45 is again closed and the ground on conductor 32 is extended through said normal contact 45 to the multiple private contacts 56 of the line A at the connectors, holding them grounded and unselectable. The said multiple contacts 56 were, on the initial operation of relay 43, grounded by attracted armature 45 so that the calling line was held busy against incoming calls during the travel of the line selector E.

On the actuation of relay 51, a circuit for relay PR was continued over conductor 67, current finding its return through conductor 66, conductor 34, contact 29—26, contact 96, conductor 121, to battery B² through relay SR, whereby relays PR and SR have a substitute circuit completed for them upon the deënergization of relay 90 at line selector E without either of them permitting at any time the retraction of their armatures.

It is now apparent that the calling line has, by the operation of the line selector E, had connected to it the relays PR and SR of the first selector F, paired with the line selector that was operated, and the said relays are now controllable by means of the dial 65 at the calling substation, which dial was unlocked as soon as cut-off relay 51 operated, by the current holding relays PR and SR energized, which traversed the magnet 60.

Before proceeding with a description of the operation of the first selector F and of the other directively operable switches, certain further explanation with respect to the line selector E is in order. The operation of this switch, when the calling line is in a sub-group other than the first, differs from that heretofore described, in that the long-step winding 10' of the magnet 10 is employed to cause the line selector's wipers to select the sub-group in which the calling line is included; whereafter the short-step winding 10 is employed to select the individual contacts of the calling line out of the selected group. The wire 39 employed to start the line selector E, when the calling line is in the first group as hereinbefore described, is not employed when the calling line is in any other sub-group than the first, the wire 41 being the starting wire for all other sub-groups.

I have shown at 47ᵃ a sub-group relay for the second sub-group, and at 47ᵇ a sub-group relay for the third sub-group. The common conductor 50ᵃ has branches to alternate contacts 46 of the ten line relays of the second sub-group, and the common conductor 50ᵇ has branches to the alternate contacts 46 of the ten line relays of the third sub-group, and it will be understood that there will be other sub-group relays 50ᶜ, 50ᵈ, etc., for the fourth, fifth, etc., to the tenth sub-groups with corresponding connections similar to those of relays 47ᵃ and 47ᵇ. The conductor 36 at relay 47ᵃ connects with the conductor 36 of Fig. 9, Part 2, connecting to the multiple sub-group contacts 31ᵇ of the second sub-group; so the conductor 37, associated with relay 47ᵇ, connects to the conductor 37 of Fig. 9, Part 2, which is in connection with the multiple sub-group contacts 31ᶜ of the third sub-group; a fourth sub-group contact 31ᵈ of Fig. 9, Part 2, of the fourth sub-group is shown, and it will be, of course, understood that, although but four sub-group contacts 31 are shown associated with the wiper 27, there will in fact be ten such contacts, a corresponding number of sub-group relays 47, and a corresponding number of grounded segments for the wiper 27; also, that although but three contacts 19 are shown associated with the wiper 2ᵃ of Fig. 9, Part 2, there will be nine such between-group contacts.

It being now assumed that the calling line is in the third sub-group, the one having the sub-group relay 47ᵇ, the removal of the receiver at the substation will operate the line relay 43 of such calling line, which relay will lock in series with the master-switch relay 73, as before. The armature 46 of such line relay will remove the ground from the individual multiple contacts 18 of the calling line in the third sub-group at the line selectors, and will close circuit to operate the sub-group relay 47ᵇ by current over the common conductor 50ᵇ, while armature 45 will ground the multiple private contacts 56 at the connectors to render them busy. The operated sub-group relay 47ᵇ, by armature 49ᵇ, removes ground from the conductor 37 and from multiple sub-group contacts 31ᶜ at the line selectors E. Armature 48ᵇ closes a bridge between conductors 70 and 75ᵃ. As soon as the interrupter wiper 72 is disconnected from one of the segments 69 or 69ᵃ and makes connection with one of the segments 71 or 71ª, circuit will be closed from ground over the conductor 70, closed contact 48ᵇ, conductor 75ª, contacts 75, 78, 80—83, conductor 41 of the line selector engaged by wiper 80, through contacts 88, 98, and relay 104 to battery B', the relay 104 locking itself by armature 107 to ground via wiper 27, multiple contact 31ª of the first sub-group and contact 49, the relay 47 being unoperated because the call is not that of the line of the first sub-group. With the operation of relay 104, the relay 90 is energized by current through attracted armature 105. The stop magnet 14 and relay 97 are, however, not operated at this time, contact 109 being open. When, now, wiper 72 of interrupter I passes over contact 69 or 69ª, current impulses will flow over the conductor 38 through contacts 108, 101, and winding 10' of magnet 10 to battery, and, obviously, the continued travel of wiper 72 and successive actuations of winding 10' will be produced as long as contacts 108, 101 remain closed. The first impulse through winding 10' effects a long step of the wipers 2, 2ª, 25, 26 and 27 (the stop magnet 14 not having been energized as mentioned) and at the end of this first step, of course, the wiper 2ª will be engaging the grounded contact 19ª, the wipers 2, 25 and 26 will be between the first and second groups of their respective contacts 18, 28 and 29, and the wiper 27 will be engaging the multiple group contact 31ᵇ of the second sub-group. Since a line of the second sub-group is not calling, relay 47ª will be inert, conductor 36 will be grounded at armature 49ª, and the relay 104 will continue energized by current through attracted armature 107, contacts 27, 31ᵇ, conductor 36, contact 49ª to ground. With the continued rotation of interrupter arm 72, another impulse will be caused to flow through the winding 10' of magnet 10, and a second long step of the wiper will be effected, at which time wiper 2ª will engage contact 19ᵇ, wiper 27 will engage contact 31ᶜ, and wipers 2, 25, 26 will be adjacent to the third group of multiple contact sets. Contact 31ᶜ having been ungrounded by the operation of armature 49ᵇ of relay 47ᵇ of the third sub-group, circuit for relay 104 is opened and the relay is deënergized, its armature 108 preventing further actuations of winding 10' of interrupter I.

It will be, of course, understood that the off normal contacts 86, 87, 88 and 89 were all shifted to their alternate circuit conditions on the initial step of the switch, the opening of contact 88 making relay 104 entirely dependent upon circuit through wiper 27 for its continued energization after the switch started.

On the deënergization of relay 104, relay 90 continued energized by current through normal contact 114, over conductor 125 and to ground through contact 2ª—19ᵇ. The closing of contact 109 will now complete an energizing circuit for stop magnet 14 and relay 97 extending through attracted armature 95, over conductor 127, closed contact 106 and 89 to ground, whereon armature 100 of relay 97 closes a locking circuit to ground at closed contact 89. As described in connection with the selection of the calling line in the first sub-group, magnet 14 has now thrown the stop into limiting position and, has attracted its armature to close circuit from generator $g$ through the short-step winding $10^2$ to ground through alternate contact 93. On the first actuation of winding $10^2$, the resulting first short step of the wipers will open contact 2ª—19ᵇ so that the relay 90 will thereon depend for its continued energization upon circuits extending through alternate contact 94, contact 116, contact 103, through the private wiper 2 and to ground upon multiple contacts 18 of non-calling lines. Relay 90 will therefore continue energized until wiper 2 engages the multiple contact 18 of the calling line, which contact will be ungrounded, due to the attracted condition of armature 46 of line relay 43 of such calling line, deënergizing the relay 90, and the armatures of said relay will be retracted, whereof 93 will open the circuit of winding $10^2$ and wipers 2, 25 and 26 will rest engaging the multiple contacts 18, 28, 29, of the calling line of the third sub-group. At this time, of course, the wiper 2ª will be somewhere between contacts 19ᵇ and 19ᶜ and wiper 27 will be in engagement with the grounded contact segment between contacts 31ᶜ and 31ᵈ; but since armature 107 was retracted before wiper 27 engaged such grounded segment, the relay 104 is inert.

It will be observed that the alternate contact at 91 caused the preliminary energizing circuit of relays PR and SR to be closed during both the long and short step travel of the line selector E. From the time the calling line in the third sub-group is selected, the operations involved in holding energized the relays PR and SR, the energization of cut-off relay 51 which results of course in the deënergization of relays 43, 73 and of sub-group relay 47ᵇ, and the moving along of the master-switch wipers 80, 81, 82, proceed in the manner before described.

The selection of calling lines in the second, fourth, fifth and other sub-groups, other than the first, will be effected in a manner apparent from the description of the selection of a line in the third sub-group, the operation being like that given except as to the point at which the relay 104 finds an ungrounded sub-group contact 31.

Returning now to the description of the connection between the calling line A in the first sub-group and the called line B, numbered 2222, the subscriber at A operates his dial 65 to cause two breaks in the circuit of line limb 67, while line limb 66 remains grounded, the two said breaks being followed by one break in the circuit of line limb 66 while limb 67 remains grounded. Each break in limb 67 deënergizes primary relay PR of Fig. 9, Part 3, relay SR remaining energized. On the first deënergization of relay PR, an impulse of current flows from ground, through contacts 132—131, 141, locking relay LR to battery $B^3$, said relay LR, by armature 148, locking itself to ground through contact 170, conductor 118 and contact 112. It will be remembered that in the directively operated switches such as first selector F, the winding of the stop magnet is normally in the stroke-limiting position. On the energization of relay LR, the stop magnet $14^a$ has a terminal of its winding connected, respectively, to battery $B^3$ and to ground through contacts 150 and 144. Said magnet is, however, unenergized until after the relay PR is again operated at the conclusion of the first break in line limb 67, for the reason that the winding of magnet $14^a$ is, while relay PR continued deënergized, short-circuited to ground through contact 135, contacts 140, 131 and 132. When, however, the break at contact 63 of substation A is closed and line limb 67 is thereby grounded via contacts 63, 64, relay PR energizes, and the opening of contact 131 removes the short-circuit about magnet $14^a$ and the said magnet energizes, withdrawing the stop and, by armature 135, closing the long-step winding $10^4$ of the private magnet $10^a$ to connection via armature 140 with the contact of armature 131. The second deënergization of relay PR, which now follows, closes circuit from ground through contacts 132, 131, 140, alternate contact 135, winding $10^4$ to battery and the magnet $10^a$ thereon effects a long step of wipers 158, 159, 160, from engagement with the first set of multiple contacts 161, 162, 163, of ten such sets assigned for connection to the first thousand of the exchange, to engagement with the first contact set $161^a$, $162^a$, $163^a$, of the second group of contact sets, such sets being connected to second selectors G for the second thousand of the exchange.

Having thus selected the group of second selectors, one of which is required to complete the desired connection to line 2222, the wipers 158, 159, 160, are now moved through short-step travel to select the contacts of an idle second selector of the second group. This is effected in response to the opening of line limb 66 at substation A, while line 67 remains grounded, which immediately follows the last opening of limb 67, as described. Thereby relay SR will be deënergized while relay PR remains operated, and an impulse of current will flow from ground through contacts 130, 133, 149 and locking relay LR' to battery, which relay, by armature 142, locks itself to ground at shifted off-normal contact $137^a$. Armature 140, of course, disconnects the winding $10^4$ of magnet $10^a$ from the upper talking conductor while armature 145 connects the winding of relay BR, via alternate contact 151, with the private wiper 158 of the first selector. Armature 144 deënergizes the stop magnet $14^a$, and the retraction of its armature ensues, whereby the stroke-limiting stop is placed in the path of the armature-actuated pawl of magnet $10^a$. Wipers 158, 159, 160, having, by the long step of the switch, been moved into engagement with the first contact step $161^a$, $162^a$, $163^a$, short-step travel of the switch F will be initiated only in case the first contact set $161^a$, $162^a$, $163^a$ has already been rendered busy by some other first selector, in which case the private contact 158—$161^a$ will be grounded. Assuming, first, that the first contact set is busy, current will flow from the grounded multiple contact $161^a$ to wiper 158, attracted armatures 151, 145, relay BR and through resistance $r$ to battery, actuating the said relay BR before relay $150^a$ has time to attract its armatures over a circuit which would be established, but for the energization of relay BR, via attracted armature 143, normal contact 138 to ground through normal contact 136. Attracted armature 139 has now connected the generator circuit of the short-step winding $10^3$ to ground via alternate contact 144; and stop magnet $14^a$ being deënergized and the stop "in", short steps of the wipers $150^a$, 159, 160 will be produced as long as the relay BR remains energized by successive circuits established via wiper 158 and busy—that is, grounded,—contacts $161^a$. As soon as the wipers of the first selector engage the multiple contacts of an idle second selector G, the contact $161^a$ will be ungrounded, relay BR will have its circuit opened and its armature will be attracted, armatures 139 preventing further actuations of magnet $10^a$ while armature 138 will close a circuit as follows: from battery $B^3$, through relay $150^a$, attracted armature 143, normal contact 138, normal contact 136, to ground whereby relay $150^a$ is energized and attracts its armatures, whereof armatures $151^a$ and 154 extend the talking conductors of the first selector to wipers 159, 160, now at rest engaging contacts $162^a$, $163^a$, of an idle second selector. Armature 153 places ground upon wiper 158, whereby the multiple private contacts of the selected second selector are held busy. A circuit is then established from ground, through attracted armatures 153, 151, 145, and through relay BR and resistance $r$ to battery, but this circuit is ineffective to energize the relay BR because of a short-circuit at this time extending from point 156 to point 155, through contacts 146 and 152, which prevents sufficient current flowing through the relay BR to energize the same.

Had the first set of contacts 161$^a$, 162$^a$, 163$^a$ been idle instead of busy, the absence of ground upon private contact 161$^a$ would have prevented the flow of energizing current for relay BR at the time its winding was, by the operation of armature 145, connected to the wiper 158. Owing to the continued deënergization of relay BR, no circuit for winding 10$^a$ is completed and relay 150$^a$ is at once operated via contact 143, normal contacts 138 and 136 to ground, the operation of the said relay 150$^a$ having the effects before mentioned,—that of grounding the multiple contacts of the second selector engaged by wiper 158, that of closing circuit through relay BR, and that of establishing a short-circuit about the one closed so that relay BR remains unoperated.

A clear circuit has now been established from condensers 173, 174, through contacts 151$^a$, 154 to the wipers 159, 160, and the idle contacts 162$^a$, 163$^a$ and to the mechanism of the second selector G, assumed to be the one selected, which is now ready to be operated in response to the second set of deënergizations of relays PR and SR to be produced by subscriber A by the further actuation of its calling device. Before proceeding with this, however, it is in order to refer to the operation of the first selector F when its wipers 158, 159, 160 are to be caused to select contacts of the first group of second selectors, those of the first thousand. This operation differs somewhat from that in which contacts of other groups are to be selected, because no long step of the wipers 158, 159, 160 is produced, inasmuch as the normal position of wipers 158, 159, 160, is one in which they rest engaging the first contact set of the first group of second selectors. To cause selection of idle contacts of the first group, the calling subscriber would operate his dial to cause one deënergization of relay PR followed by one of relay SR. The deënergization of relay PR would, as before mentioned, result in the operation of locking relay LR and the locking thereof as before described, and the actuation of the stop magnet 14$^a$ would follow as soon as the short-circuit about its winding at armature 135 was removed on the subsequent energization of relay PR. The deënergization of relay SR, following the single deënergization of relay PR, results in the energization of locking relay LR', as before described, the said relay now locking itself, however, via armature 142, contact 137$^a$—137, contact 147 and over conductor 118 to ground instead of to ground via alternate contact 137$^a$ as before. The wipers of the first selector F have, in this case, remained at normal; and from this point on, the initiation of short-step travel of the switch is produced in the manner before described and the selection of idle contacts is effected in the same manner as that before described, in case the first contact set, that normally engaged by wipers 158, 159, 160, has been rendered busy. However, if the first contact set is idle at the time the relay LR is operated, relay BR receives no current and relay 150$^a$ is immediately energized, as before described, by its armature 153 placing ground upon the first contact set that is now assumed to be idle. It is thus seen that when a calling subscriber desires to be connected with a subscriber's line in the first thousand of the exchange, and if the first contact set of that thousand be idle, the first selector that is connected with the calling line is on a contact set of an idle second selector, and the impulses transmitted to the first selector, while producing the proper changes in the electrical circuit of the switch, do not cause any travel of the switch wipers at all.

The calling subscriber at A now actuates his dial 65 to produce breaks in the circuit of limb 67 corresponding to the second digit of the called subscriber's number, namely, two breaks, whereby relay PR will be twice deënergized and two impulses of current will be transmitted from ground through contacts 132—131, 151$^a$, 159—162$^a$, conductor 165, contact 184, locking relay LR$^3$ to battery B$^4$, relay LR$^3$ energizing and, by armature 180, locking itself to ground at the first selector F via conductor 164, contact 162$^a$—158, through points 155, 156 and armature 153. Armature 182 connects battery through resistance $r'$, stop magnet 14$^b$ to ground via normal contact 187, but magnet 14$^b$ is not actuated by current over this circuit until after relay PR is operated at the conclusion of its first deënergization, a short circuit about the winding of magnet 14$^b$ extending via contact 183 and to ground through contacts 131 and 132 as long as relay PR is deënergized. With the removal of this short-circuit, however, magnet 14$^b$ attracts its armatures and withdraws the limiting stop, armature 167 connecting the long step winding 10$^c$ of driving magnet 10$^b$ to conductor 165, via contact 183. The first impulse transmitted from conductor 165, therefore, produces no steps of the wipers 201, 202, 203, and they remain engaging the first contact set 204, 205, 206 of their first group of connectors, this being the normal position of the wipers. The second deënergization of relay PR transmits a current impulse over the before-traced path, through conductor 165, through normal contact 183, alternate contact 167, long-step winding $10^b$ and to battery $B^4$ whereby a long step of wipers 201, 202, 203 is produced and they are brought to engage the first set of contacts $204^a$, $205^a$, $206^a$, of the group connected to connectors for the second hundred lines of the second thousand.

After the second deënergization of relay PR, a single deënergization of relay SR will, of course, be produced and an impulse of current transmitted from ground through contacts 130, 133, 154, 160, $163^a$, over conductor 166, contact 181, and locking relay $LR^4$ to battery $B^4$, the said relay $LR^4$ then locking itself to ground at shifted off-normal contact 190. Attracted armature 185 connects the winding of relay BR', via alternate contact 178 to wiper 201 and the engaged contact $204^a$ of the first set of the second group. Assuming first that the set belongs to a busy connector, it will be understood that the relay BR' will be operated and armature 192 will prevent actuation of the relay 193 upon the deënergization of magnet $14^b$, which occurs as soon as armature 187 of relay $LR^4$ was attracted. Stop magnet $14^b$ being deënergized and its stop "in," short steps of the second selectors G will be produced by current pulsations through the short-step winding $10^5$, attracted armature 191 and alternate contact 187 to ground as long as relay BR' remains operated, in which condition said relay will remain by current via wiper 201 and to ground through successive contacts $204^a$, multiple terminals of busy connectors, until the wipers 201, 202 and 203 engage contacts $204^a$, $205^a$ and $206^a$ of an idle connector. The contact $204^a$ then engaged will be ungrounded, relay BR' will be deënergized, and its armature 191 will prevent further actuations of the winding $10^5$ whereby the switch wipers stop. Relay 193 now operates by current through attracted armature 188, normal contact 192 and normal contact 168 to ground. Armature 195 of relay 193 connects ground to the private multiple contacts $204^a$ of the selected connector of the second group, circuit being traced through wiper 201, points 199 and 200, attracted armature 195, attracted armature 177 of relay $LR^3$ to ground. The winding of relay BR' is connected from battery at this time through alternate contacts 185, 178 and 200 with ground at attracted armature 177, but current over this path does not sufficiently energize the relay BR' to cause it to attract its armatures because of the short circuit extending around its winding from point 198 through attracted armatures 196 and 200 to ground.

Had the first contact set of the second group been idle, the private contact $204^a$ would have been ungrounded and relay BR' would have received no energizing current. The relay 193 would, therefore, have immediately operated upon the energization of locking relay $LR^4$ and the attraction of its armature 188, by current through normal contact 192 and to ground through contact 168 as soon as the magnet $14^b$ deënergized, the relay 193 then placing ground upon the multiple contact 204, as before described, and closing circuit through relay BR' with the accompanying short circuit to render it ineffective as described.

Had the calling subscriber desired his line to be connected with that of a subscriber included in the first hundred group of the second thousand, no long step of the wipers 201, 202, 203, would have been produced, when relay PR was deënergized a single time. When relay SR was thereafter deënergized, the busy relay BR' would have been connected to the private wiper 201, and if the first contact set of the first group had been busy, the first selector would have started on short-step travel, in a manner obvious from what has preceded, to select idle contacts of the first group. If the first contact set of the first group had been idle, no travel of the wipers 201, 202, 203, would have been occasioned for reasons similar to those explained in connection with the first selector circuit diagram.

By the energization of relays $LR^3$ and $LR^4$ and 193, a clear circuit has been established from condensers 173, 174, at F over the conductors 165, 166, to wipers 202, 203, and the multiple contacts $205^a$, $206^a$ of the selected connector, assumed to be the one shown at H, and over its wires 208, 209, to the mechanism thereof.

The calling subscriber A now operates his dial 65 to produce two deënergizations of relay PR, representing the third digit in the called subscriber's number, which deënergizations will be followed by the single deënergization of SR. On the first deënergization of relay PR, a current impulse is transmitted from grounds over a before-traced circuit to conductor 165, thence via contacts 194, 202—$205^a$, wire 208, normal contact 219, locking relay $LR^5$ to battery $B^5$, which relay operates and, by armature 214, locks itself to ground over the private conductor 207. Armature 216 of relay $LR^5$ connects battery $B^5$ through stop magnet $14^c$ with ground, but the stop magnet cannot be energized to withdraw the stop pawl of driving magnet $10^c$ until a short circuit at closed contact 132 of relay SR of the first selector F is removed on the energization of relay PR, the said short circuit being traceable from the normal armature contact of magnet $14^c$ and normal contact 218. As soon, however, as the first impulse over wire 208 ceases, the short circuit will be removed and magnet $14^c$ actuated to withdraw its stop from the path of the driving pawl. On the second deënergization of relay PR, therefore, the transmitted current impulse will flow over conductor 208, through normal contact 218, attracted armature of magnet 14ᶜ, the long-step winding 10⁸ of magnet 10ᶜ and to battery B⁵ producing a long step of the switch wipers 249, 250, 251, to a position adjacent to the second group of ten line contact sets of the second hundred of the second thousand, the said group comprising multiple contacts of lines numbered from 2221 to 2229 consecutively, followed by contacts of line 2220.

After the second impulse over conductor 208, a deënergization of relay SR will transmit an impulse over conductor 209, through attracted armature 215, locking relay LR⁶ to battery, and said locking relay by armature 220 connects its winding to ground at the shifted off-normal spring contact 211. Attracted armature 221 immediately opens the circuit of stop magnet 14ᶜ and the said magnet is deënergized, its retracted armature moving the stop pawl to the stroke-limiting position.

The subscriber A now actuates the dial 65 to produce two openings in the circuit of line conductor 67, followed by one in the line conductor 66. The first break in conductor 67, of course, deënergizes relay PR and an impulse is transmitted from ground over conductor 208, a part of the current flowing through alternate contact 218 and locking relay LR⁷ which energizes, and by armature 224, locks to ground at alternate contact 217. The rest of this first impulse flows through alternate contact 219, contact 212, contact 241 and the winding 10⁸ of magnet 10ᶜ, causing an actuation thereof; and since stop pawl is "in", a first short step of wipers 249, 250, 251, is produced. A second impulse, transmitted over conductor 208 by the second deënergization of relay PR, passes over the last traced circuit including alternate contact 219 and the winding 10⁸ of relay 10ᶜ, and a second short step of the wipers is produced, which will then engage the second contacts of the second group, the said contacts being multiple terminals of line 2222 connected to substation C. A final deënergization of relay SR, occurring by the opening of line conductor 66, now transmits a current impulse over conductor 209, through contact 223, contact 239, the upper winding of test relay TR and to battery, energizing the said relay. Upon the attraction of its armature 235, the lower winding of the relay TR is connected from battery, through contact 225, alternate contact 235, to the test or private wiper 249, now engaging the multiple contact 56ᵃ of the called-for line. When relay TR energized, armature 236 actuated the relay 238 which, by armature 240, locked itself to ground at alternate contact 217, the armature 239 opening the initial energizing circuit of relay TR. Assuming first that the called-for line is idle, the said multiple contact 56ᵃ will be connected with the active side of battery B⁵, as shown, and since the lower winding of relay TR is also connected with the active side of said battery, the relay becomes deënergized and its armatures are retracted. On the retraction of the armatures of relay TR, a circuit is completed as follows: from ground, through the relay 226, attracted armature 242, normal contact 235, contact 249—56ᵃ, normal contact 45 of the called line and to battery through cut-off relay 51, actuating the said relay which, by armature 53, puts ground from contact 56ᵃ upon the conductor 32 leading to the private banks at the line selectors, whereby the called-for line remains unselectable at the line selectors. The ground upon the multiple contact 56ᵃ from relay 226 renders the called multiple contacts 56ᵃ, 57ᵃ, 58ᵃ of the called line busy with respect to the other connectors having access to them.

The winding of relay 248 now has its circuit closed from ground, through the constantly rotating interrupter I′, attracted armature 228, said relay 248 to battery, and relay 248 will be alternately energized and deënergized with the travel of the interrupter I′, alternately connecting wiper 250 with generator $g$ when energized, and with relay 231 when deënergized. The substation bell will ring when generator $g$ is connected with the wiper 250, the circuit being traced through contact 57ᵃ over line limb 67, through call-bell and condenser at the substation, returning over conductor 66, contact 58ᵃ, 251, armature 229 and impedance 230 to battery. The interrupters I′ and I² are preferably mounted upon the same shaft so that their travel is synchronous, and the interrupter I² will disconnect the generator $g$ from the called line and substitute therefor a short-circuit to ground a short period before each deënergization of relay 248 occurring with the rotation of the interrupter I′. This arrangement is to secure a discharged condition of the line circuit before the relay 231 is placed in connection therewith, in order to, with certainty, prevent said relay from being actuated by current discharges from the telephone line and before the called subscriber removes his receiver.

The called subscriber, in answering his call, removes his receiver and hook-lever 59 is raised to alternate position, closing a conductive bridge through the substation. As soon as this occurs and relay 231 is, by retraction of armature 248ᵃ, connected with the wiper 250, circuit may be traced from ground through said relay, contact 227, normal contact 248ᵃ, contact 250—57ᵃ, over conductor 67, through the transmitter and the inductance of magnet 60 of the substation, returning over limb 66, contact 58ª—251, impedance 230 to battery, this path supplying talking current to the called-for substation. The closing of contact 232—234 establishes a branch locking path for the relay LR⁵, which serves as a release relay, and the connector H now depends for its restoration upon the called-for station C. The closing of contact 232—233 operates the relay 243 which, by armature 245, locks to ground at alternate contact 217. Attracted armatures 244 and 247 of this relay complete the circuit of the talking strands of the connector, and armature 246 opens the circuit of interrupter I' so that the relay 248 continues unoperated and generator $g$ excluded from circuit with the called-for line.

As soon as the contact 247 was closed as described, current from ground at relay 231, passing over the limbs of the called-for line, finds its way through closed contact 247, to the left, over conductor 209 to conductor 166 and over the lower talking conductor at the first selector F, through alternate contact 133 and through release relay RR to battery B³, whereon the attracted armature 176 closes circuit from ground at the line selector E, over conductor 118, through reversing relay RV and to battery B³, said reversing relay being operated and, by armature 171, locking itself over conductor 118. Armatures 169 and 172, by their make-before-break arrangements, reverse the connections of batteries A² and B² to the limbs of the calling line whereby the direction of current flow in said line is reversed. This reversal may be employed for the purpose of operating any of the well-known forms of polarized call-counting or coin-controlled devices whereby measured service may be afforded.

The calling subscriber A and the called-for subscriber C are now in conversation through condensers 173 and 174, talking current to the calling line being supplied from the serially connected batteries A² and B², through the inductive resistances of relays PR and SR, while talking battery is supplied to the called-for line from battery B⁵, through the impedance 230 and the impedance of relay 231.

When the subscribers have finished their conversation, they replace their receivers. When the calling subscriber A does so, all switches except the connector H will be restored to normal, and the restoration of this switch will remain to be accomplished from the called substation. If the called subscriber first replaces his receiver, all the switches except the line selector E will be restored to normal, the latter remaining to be restored by the calling subscriber when he replaces his receiver.

Let it be assumed first that the calling subscriber A first hangs up his receiver. In such case, hook-lever 59 opens the conductive circuit of line limbs 66—67 and the two relays PR and SR simultaneously are deënergized for the first time since they were initially operated. Retracted armatures 128, 129, close circuit from ground over release wire 119 through normal contact 92, attracted armature 99 and relay 110 to battery, the said relay immediately energizing and, by armature 114, operating the relay 90. It will be remembered that magnet 14 and relay 97 are locked over a series circuit including armature 100 and shifted off-normal contact 89 so that the stop pawl of magnet 14 is in the stroke-limiting position. Generator current now passes through winding 10² of magnet 10, attracted armature of magnet 14, alternate contact 93 to ground. Since relay 110 has, by armature 113, locked itself to ground, it is apparent that short steps of switch E will continue to be produced. When the wipers of the line selector E have made enough short steps to reach normal, the off-normal contact 89 is opened, magnet 14 and relay 97 have their locking circuit opened, and the retracted armature of magnet 14 will prevent the further actuations of winding 10². Retracted armature 99 of relay 97 deënergizes relay 110, and retracted armature 114 of the latter deënergizes relay 90 when the mechanism of the line selector will be at normal. As soon as the wipers of the line selector E left the multiple calling contacts of the line of A, the cut-off relay 51 of said line had its circuit opened, and the line circuit of A was in its normal condition. On the deënergization of relay SR, as described, the retraction of armature 133 opened circuit of release relay RR, and the armatures of the said relay were retracted. Locking relay LR is now deënergized, contact 175 having been opened and ground having been removed from the conductor 118 by armature 112 at switch E. On its retraction, armature 151 energizes the relay BR by current through attracted armature 145; and armature 138 of said relay BR, being attracted, deënergizes the relay 150ª whose retracted armatures 151ª, 154, place the wipers 159, 160, upon open circuit during release. Armature 139 of relay BR now closes a circuit from generator $g$, through winding 10³ to magnet 10ª, and through alternate contact 144 to ground. As long as relays BR and LR' remain energized, it is apparent that successive short steps of the first selector F will be produced, turning the wipers 158, 159, 160 around until they reach normal. When they do reach this point, the locking circuit for relay LR', extending through alternate contact 137ª, will be opened, and retracted armature 144 will prevent further actuations of magnet $10^a$, whereby the switch wipers rest in their normal positions. On the retraction of armature 145, relay BR will be deënergized and the mechanism of first selector F is then at normal, the reversing relay RV having had its locking circuit opened when ground was removed from conductor 118 on the initial restoring movement of line selector E.

It will be observed that the conductor 40, connected to the controlling contact 84 at the master-switch D, is, during the release of the line selector E, held grounded at alternate contact 111 so that the master switch D will be prevented from stopping upon the contact 84 of the releasing line selector. In case the line selector E reaches normal before its paired first selector F reaches normal, the contact 84 is not rendered selectable until the selector F reaches normal. It will be seen that conductor 40, upon the retraction of armature 111, is connected to the wire 117 which extends to the first selector F, and during the restoration thereof, is connected to ground via alternate contact 138 and normal contact 136. Thus, until the switch pair EF is fully restored, the contact 84 remains unselectable.

As soon as the first selector F started to be restored, the wiper 158 was placed on open circuit and consequently ground was removed from the private contacts $161^a$ of the second selector G. The locking circuit of relay $LR^3$, which serves as a release relay, is thereby opened and the relay deënergized. The closure of normal contact 178 operates relay BR' by current through closed armature 185 of relay $LR^4$. Attracted armature 192 of relay BR' deënergizes relay 193 so that the contact wipers 202, 203, are on open circuit at contacts 194, 197 during the release. The closure of alternate contact 192 places ground from armature 168, via normal contact 180, over conductor 164, upon the multiple private contacts $161^a$ of the second selector G, this circuit continuing closed until the second selector G reaches normal, whereby its seizure by any other first selector prior to its complete restoration is prevented. Circuit may now be traced from generator $g$ through winding $10^5$, through attracted armatures 191—187 to ground, and successive actuations of magnet $10^b$ will be produced, causing short steps of the second selector G until it reaches normal. Normal being reached, off-normal contact 190 is placed in its original condition, and the locking circuit of relay $LR^4$ is opened and the relay deënergized. Its armatures are retracted, armature 185 deënergizing the relay BR', and the mechanism of the second selector G is fully restored, the actuations of magnet $10^b$ having been previously terminated by the opening of alternate contact 187.

Since it has been assumed that the called subscriber C has not yet replaced his receiver, the relay 231 at connector H has continued operated, and the continued closure of contact 232—234 prevented locking relay $LR^5$, which serves as a release relay for the connector, from being deënergized when ground was removed from conductor 207 by the initiation of the release of the second selector G. When, however, the called-for subscriber now replaces his receiver, relay 231 deënergizes and the opening of contact 232—234 deënergizes relay $LR^5$, whose retracted armature 217 terminates the flow of current through relays $LR^7$, 238 and 243. Said armature 217, by engaging its normal contact, now closes a circuit for generator $g$ through winding $10^7$ of driving magnet $10^c$, through attracted armature 222 of relay $LR^6$ to ground. Short steps of the line selector H will now be produced, continuing until the wipers 249, 250, 251 complete a revolution. The wipers being then at normal, alternate contact 211 opens, causing the deënergization of locking relay $LR^6$, whose retracted armature 222 prevents further actuations of magnet $10^c$, the wipers then resting at normal. When relay 238 became deënergized by the opening of alternate contact 217, as before described, relay 226 had its circuit opened at contact 242 and the cut-off relay 51 of the called-for line also had its circuit opened whereby the line circuit of C was restored to its normal condition.

Let it be assumed that the called-for subscriber replaces his receiver in advance of the calling subscriber. In such case, relays PR and SR at first selector F remain unaffected, but the opening of the conductive circuit between line limbs 66 and 67 at substation C opens the circuit of release relay RR at F. The said relay therefore deënergizes, but reversing relay RV remains operated because the conductor 118 is still grounded at E. The opening of contacts 175 and 176 will leave no path for the flow of current through the locking armature 148 of relay LR, the said relay consequently is deënergized, and the release of the first selector F, second selector G and connector H proceed in the manner before described. When, now, the calling subscriber replaces his receiver, the relays PR and SR will be simultaneously deënergized, closing contacts 128, 129, whereby the energization of relay 110 at line selector E is produced in the manner before described, and the release of the line selector proceeds as before.

Let it now be assumed that the called-for line was found busy at the time the last impulse was transmitted from conductor 209 by secondary relay SR whereby relay TR was energized and connected to the test wiper 249. The called line being assumed busy, its multiple private contact 56ª engaged by wiper 249 will be grounded and current will find its way from the grounded contact 56ª, through wiper 249, alternate contact 235, contact 225, and through the lower winding of relay TR to battery B³, the relay TR being thereby locked, and its energization continued. Since armature 235 continues attracted, the relay 226 remains unoperated. The busy interrupter I³ is now held connected to conductor 208 through the continuance of the attracted armature 237 of relay TR, and the busy signal is transmitted to the left over the upper talking conductor through the substation A, giving the customary busy tone in the receiver, returning over the lower talking conductor and through the winding of relay SR to battery. Upon hearing the signal, the calling subscriber knows that the called-for line is busy and replaces his receiver, causing the restoration of line selector E, first selector F and second selector G, in the manner before described when the calling subscriber replaced his receiver before the called subscriber. In the present case, however, the act of the calling subscriber restores to normal also the connector H. It will, of course, be apparent that since the relay 226 at connector H was not operated, the relay 231 has remained inert. Therefore, the locking relay LR⁵, which serves as a release relay, depends for its continued energization entirely upon the ground connected to conductor 207 at the second selector G. When this ground is removed, upon the initiation of the release of the said second selector G, relay LR⁵ deënergizes and the mechanism of the connector H is restored to normal in a manner similar to that before described, the test relay TR being, of course, deënergized, as soon as contact 225 is opened.

It is of course apparent that, had the called-for line had its contacts included in the first group of contacts before the wipers 249, 250 and 251, no long step of the wipers would have been produced, a single impulse over the wire 208 only having, in such case, been transmitted to represent the third digit of the called number. In such case, the relay LR⁵ would have operated as before, and upon the transmission of a secondary impulse over conductor 209, the relay LR⁶ would have been operated as before, except that under the present circumstances it would, by armature 220, have been locked via normal contact 211, 210, and alternate contact 213 to the private wire 207. Of course, when thereafter the first adjusting impulse was caused to flow over wire 208 to produce short steps of the connector's wipers to select the contact of the line in the first group, alternate contact 211 would be closed on the first short step and the remaining operations would have been as before described.

As has been heretofore indicated, if the first selector F had been so operated as to select multiple contacts 161, 162, 163, out of its first contact group, and if the first contact set of the first group had been idle, there would have been no travel of the switch wipers 158, 159, 160. Similarly, if the second selector G had been caused to select idle contacts of its first group, and the first contact set 204, 205, 206, of the first group had been idle, no movement of the switch wipers would have been produced. In such case, the locking relay LR' at first selector F would have its locking circuit completed through contact 137ª—137, through attracted armature 147 and through armatures 170 and 175, over conductor 118 to ground, alternate contact 137ª not having been closed at all, owing to the failure of the switch wipers to travel. Therefore, assuming this condition, when ground was removed from conductor 118 at the initiation of the release of the line selector, relays LR and LR' would both have been simultaneously deënergized. Since contact 145 would be opened before the closure of normal contact 151 could energize the relay BR, the said relay BR would remain inert and accordingly no circuit for generator $g$ through winding 10³ would be closed and the switch wipers 158, 159, 160 would continue at normal. The opening of contact 143 would deënergize the relay 150ª and the mechanism of the first selector F would be at normal. The wipers of the first selector would remain stationary, no matter from which end of the talking circuit the release was initiated, since if relay RR was deënergized from the called station, the relay LR would be deënergized and the opening of its contact 147 would deënergize the relay LR', and the time relations of the break of contact 145 and the make of normal contact 151 would, of course, be so adjusted as to prevent the operation of relay BR and the consequent complete circular travel of the switch wipers.

So in the case of the second selector G, when it employs the first contact set of its first group in establishing connection, the relays LR³ and LR⁴ both depend for their locking circuits upon the private conductor 164 whose grounded condition is controlled at the first selector F, since contact 190—189 remains closed and alternate contact 190 has remained opened therefore. The removal of ground from the private wire 164 at the beginning of the release operations of the first selector F will therefore deënergize both relays LR³ and LR⁴ and no operation of relay BR' will result, so that no actuating circuit for magnet 10ᵇ will be produced, the switch wipers 201, 202, 203, therefore, remaining at rest.

The invention is not limited to the precise structures shown and described, as the switch may obviously be modified for instance, to meet various circuit conditions or convenience of manufacture.

I claim as my invention:

1. A selective switch comprising contacts arranged in groups, and an electromagnet and associated stop mechanism for producing long step travel of said switch to select a group and short step travel to select contacts of a group.

2. A selective switch including contacts arranged in groups, a driving pawl, and a magnet and associated stop mechanism for effecting long strokes of said pawl to cause said switch to select the group and short strokes of said pawl to select contacts of the group.

3. A selective switch including electromagnetic means for producing the travel thereof, an armature for said magnet having a definite actuating distance, and coöperating electromagnetic means for altering said distance of actuation.

4. In a selective switch, the combination with a switch-driving armature, of an electromagnetically adjustable stop adapted to alter the effective stroke of said armature.

5. A selective switch including contacts arranged in groups, movable contact-makers for engaging said contacts, a magnet for said switch, an armature for said magnet for producing long steps of said contact-makers to select a group, and an electrically adjustable stop for altering the operation of said armature, enabling it to effect short steps of said switch to select an individual contact of a group.

6. A selective switch including contacts arranged in groups, movable contact-makers for engaging said contacts, a magnet for said switch, an armature for said magnet for producing long steps of said contact-makers to select a group, and a coöperating magnet for shortening the stroke of said armature when a group has been selected.

7. A selective switch including contacts arranged in groups, movable contacts for said switch, magnetically actuated driving means for causing long steps of said movable contacts to move them over contact groups to select a group, and a magnet controlling a stop adapted to be moved into the path of said means whereby said means produce short steps of said movable contacts to select individual contacts.

8. A selective switch including contacts arranged in groups, a shaft for said switch carrying wipers to engage said contacts, a driving magnet for actuating said shaft to produce long steps of said wipers to select a group, and an auxiliary magnet controlling means for limiting the effective actuation of said driving magnet upon said shaft to produce short steps of said wipers to select individual contacts.

9. A selective switch including groups of contacts arranged in a circular bank, a rotary shaft supporting wipers adapted to engage said contacts, a magnet provided with an armature for producing long rotary steps of said shaft to adjust said wipers to select the different groups, and an auxiliary magnet for enabling said armature to produce short rotary steps of said shaft.

10. A selective switch including contacts arranged in groups, a rotary shaft supporting wipers adapted to engage said contacts, a driving magnet having an armature for effecting a long step of said shaft to move said wipers the space of a contact group, an auxiliary magnet controlling an adjustable stop adapted to reduce the stroke of said armature to cause it to effect a short step of said shaft moving said wipers from one contact of a group to the next.

11. A selective switch included a suitably journaled rotary shaft supporting wipers, contacts for engagement thereby, a ratchet for said shaft, an electromagnet and armature and associated actuating pawl for driving said ratchet and shaft, and means permitting long strokes of said armature to drive said shaft by long steps in one condition of use of said switch and for temporarily reducing the stroke length of said armature whereby said armature drives said shaft by short steps in a second condition of use.

12. A selective switch including a suitably journaled rotary shaft supporting wipers, contacts for engagement thereby, a ratchet for said shaft, an electromagnet and armature for rotating said shaft, and means permitting long strokes of said armature to drive said shaft by long steps in one condition of use of said switch and for temporarily reducing the stroke length of said armature whereby said armature drives said shaft by short steps in a second condition of use.

13. In a selective switch adapted to make long and short step travel according to the condition of use, a single member for producing both the long step and the short step travel, a stop adapted to be placed in the path of said member and a magnet for controlling said stop.

14. In a selective switch adapted to make long and short step travel according to the condition of use, a single armature controlled member for producing both the long step and the short step travel, and an armature controlled stop adapted to be placed in the path of said member.

15. A selective switching mechanism having a switch actuating magnet, an armature for said magnet, a pole-piece for said magnet having one surface adapted to be cleared by one portion of said armature on its attraction and another surface lying in the path of attraction of another portion of said armature, a stop for limiting long strokes of said armature and a second stop, electrically adjustable to reduce the stroke length of said armature.

16. A selective switch comprising four self contained units, a contact bank member, a wiper and ratchet member, an electromagnetically adjustable pawl stop member, and a driving mechanism including a magnet, armature and driving pawl, adapted by a single stroke to move the wiper over one or more contacts according to adjustment of the stop member.

17. Selective mechanism including the switching magnet 10 for producing long and short steps, the armature 3, the stationary stop 12 for limiting the long strokes of said armature, and the electrically adjustable stop 5 for limiting the short strokes of said armature.

18. A selective switch structure including the driving magnet 10, the pawl armature 3, means for actuating said magnet to produce long strokes of said armature, stop 5, and the auxiliary magnet 14 controlling the stop 5 adapted to be controlled to limit the strokes of said armature.

19. A selective switch including contacts arranged in groups, a magnet for effecting long steps of said switch to select the group, and means for causing said magnet to effect short steps of said switch to select contacts of a group, and for thereafter restoring said switch to normal.

20. In a selective switch, means for producing a step-by-step movement thereof, means for preventing a partial step position of the switch including ratchet 20, the retaining pawl 7, and an auxiliary member adapted to strike said pawl at the conclusion of each step and force it into full engagement with a tooth of said ratchet.

21. A rotary selective switch including contacts in groups, a switch adjusting magnet, means for causing said magnet to rotate said switch by long steps, electrically operated means for causing said magnet to rotate said switch by short steps to select individual contacts, said last-mentioned means being also employed to rotate said switch to complete a revolution to normal.

22. In a step by step selective switch, means including a ratchet for producing a step by step movement thereof, a ratchet engaging member for preventing partial step positions of said switch, and means for actuating said member.

23. In a step by step selective switch, means including a ratchet for producing a step-by-step movement thereof, a ratchet engaging member for preventing partial step positions of said switch, and supporting means for said member adjustably secured to said switch.

24. In a step by step selective switch, means including a ratchet for producing a step by step movement thereof, a ratchet engaging member for preventing partial step positions of said switch, means for actuating said member, and supporting means for said member adjustably secured to said switch.

25. In a step by step selective switch, means including a ratchet for producing a step by step movement thereof, a ratchet engaging member for preventing partial step positions of said switch, armature-controlled mechanism for striking said member, and supporting means for said member adjustably secured to said switch.

26. In a step by step selective switch, means including a ratchet for producing a step-by-step movement thereof, a ratchet engaging member for preventing partial step positions of said switch, and armature-controlled mechanism for striking said member.

27. In a step by step selective switch, means including a ratchet for producing a step-by-step movement thereof, a ratchet engaging member for preventing partial step positions of said switch, armature controlled mechanism for striking said member, and an independently adjustable stroke-limiting device to relieve the pressure on said member after being struck.

28. A selective switch including a step-producing armature, an electrically adjustable stop member for controlling the extent of actuation of said armature, and means for adjustably securing said member to said switch.

29. A selective switch including a step-producing armature, an electrically adjustable stop member for controlling the extent of actuation of said armature, and adjustable mounting means for said member.

30. A selective switch including a step-producing armature, an electrically adjustable stop member for controlling the extent of actuation of said armature, a ratchet, a piece to engage said ratchet serving to prevent partial step positions of said switch, and common adjusting means for said member and said piece.

31. A selective switch including a step-producing armature, an electrically adjustable stop member for controlling the extent of actuation of said armature, a ratchet, a piece to engage said ratchet serving to prevent partial step positions of said switch, a support common to said member and said piece, and means for adjustably fastening said support to said switch.

32. A selective switch including a rotary switch shaft, a rigidly attached ratchet for operating said shaft, an armature having a pawl adapted to engage said ratchet, a support for said armature alined with said shaft, and a magnet for said armature lying parallel to said shaft.

33. A selective switch including a rotary switch shaft, a magnet lying parallel to said shaft and having a pole-piece at one side of said shaft, and a pawl actuating armature of said magnet for controlling said shaft pivoted in alinement with said shaft.

34. A selective switch including a switch shaft, an electromagnet lying parallel to said shaft and having a pair of pole-pieces adjacent to said shaft, and an armature for said magnet pivoted in alinement with said shaft, said armature extending transversely to proximity with said pole-pieces.

35. A selective switch including a switch shaft, an electromagnet lying parallel to said shaft and having a pair of pole-pieces adjacent to said shaft, an armature extending transversely to said pole-pieces, and a central support for said armature mounted in alinement with said shaft.

36. A step-by-step selective switch including a circular contact bank, a rotary ratchet and wiper suitably journaled at the center of said bank, a magnet armature for advancing said ratchet and wiper, independently and centrally supported by bearings concentric with said ratchet, and a magnet having a pair of pole pieces suitably mounted to attract the opposite ends of the said armature.

37. A selective switch including a switch-actuating magnet provided with a pair of magnet spools, cores for said spools respectively in closed magnetic circuit at one end of said magnet, a retaining pawl, a transversely extending armature rotarily supported between said spools and extending adjacent to each core and stops for limiting the movement of said amature, one of said stops being located on said retaining pawl.

38. A selective switch including a rotary shaft, switch wipers supported by said shaft, a ratchet for turning said shaft, a switch adjusting magnet having two adjacently disposed magnet spools, an armature for said magnet extending between said spools and pivoted at the center of said shaft, and a ratchet actuating pawl for said armature.

39. A selective switch including a rotary switch shaft, a rigidly attached ratchet for operating said shaft, a magnet armature having a pawl adapted to engage said ratchet, a support for said armature alined with said shaft, a retaining pawl and adjustable stops for limiting the forward and back strokes of said armature, one of said stops being located on said retaining pawl.

40. A selective switch including a switch shaft, an electromagnet having a pair of pole-pieces adjacent to said shaft, an armature for said magnet pivoted in alinement with said shaft, said armature extending transversely to proximity with said pole-pieces, a retaining pawl and adjustable stops for limiting said armature on attraction and retraction, one of said stops being located on said retaining pawl.

41. A selective switch including a switch-actuating magnet provided with a pair of magnet spools, cores for said spools respectively in closed magnetic circuit at one end of said magnet, a transversely extending armature rotarily supported between said spools and extending adjacent to each core, adjustable stop means for limiting the extent of attraction and retraction of said armature, a ratchet, and a pawl carried by said armature and operative to actuate said ratchet.

In witness whereof, I hereunto subscribe my name this 8th day of April, 1908.

WILLIAM KAISLING.

Witnesses:
CAROLYN WEBER,
A. H. DYSON.